(12) United States Patent
Yasuda et al.

(10) Patent No.: US 11,939,461 B2
(45) Date of Patent: Mar. 26, 2024

(54) NON-OHMIC COMPOSITION, CABLE CONNECTION UNIT, AND METHOD FOR PRODUCING CABLE CONNECTION UNIT

(71) Applicant: SUMITOMO ELECTRIC INDUSTRIES, LTD., Osaka (JP)

(72) Inventors: Shuhei Yasuda, Osaka (JP); Takanori Yamazaki, Osaka (JP); Shinya Nishikawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 426 days.

(21) Appl. No.: 17/418,081

(22) PCT Filed: Oct. 8, 2019

(86) PCT No.: PCT/JP2019/039695
§ 371 (c)(1),
(2) Date: Jun. 24, 2021

(87) PCT Pub. No.: WO2020/148950
PCT Pub. Date: Jul. 23, 2020

(65) Prior Publication Data
US 2022/0064428 A1 Mar. 3, 2022

(30) Foreign Application Priority Data
Jan. 18, 2019 (JP) .................. 2019-006887

(51) Int. Cl.
*C08L 23/16* (2006.01)
*C08L 23/02* (2006.01)
(Continued)

(52) U.S. Cl.
CPC .............. *C08L 33/02* (2013.01); *C08L 23/16* (2013.01); *H01B 1/20* (2013.01); *H02G 15/064* (2013.01);
(Continued)

(58) Field of Classification Search
CPC . C08K 3/22; C08L 2203/202; C08L 23/0869; C08L 23/16; C08L 23/20;
(Continued)

(56) References Cited

U.S. PATENT DOCUMENTS 5,742,223 A * 4/1998 Simendinger, III ..... H01C 7/18
338/21
2005/0139373 A1* 6/2005 Gramespacher ..... H02G 15/068
174/74 R
(Continued)

FOREIGN PATENT DOCUMENTS

JP 54137651 U * 10/1979 ............... H01B 1/20
JP S54-137651 A 10/1979
(Continued)

OTHER PUBLICATIONS

Non-Ohmic Behaviour Binary ZnO—Nb2O5 Sys_Asokan et al._ 1019-1023_1987.*
(Continued)

*Primary Examiner* — Timothy J Thompson
*Assistant Examiner* — Guillermo J Egoavil
(74) *Attorney, Agent, or Firm* — Oliff PLC

(57) ABSTRACT

A non-ohmic composition including a base elastomer and a plurality of non-ohmic particles, wherein, in a case of comparing volume resistivities ρ for the non-ohmic composition within a range of E≥$E_{th}$ for the non-ohmic composition not elongated, the E being an electric field strength applied to the non-ohmic composition, the ρ being the volume resistivity of the non-ohmic composition, and the $E_{th}$ being a threshold electric field strength at a point where an absolute value of a variation in a slope of log ρ with respect to log E is maximum, the volume resistivity ρ for the
(Continued)

non-ohmic composition uniaxially elongated by 50% is 50 times or less the volume resistivity $\rho$ for the non-ohmic composition not elongated.

17 Claims, 9 Drawing Sheets

(51) Int. Cl.
  *C08L 33/02* (2006.01)
  *H01B 1/20* (2006.01)
  *H02G 15/064* (2006.01)
  *H02G 15/08* (2006.01)

(52) U.S. Cl.
  CPC ........ *H02G 15/08* (2013.01); *C08L 2203/202* (2013.01)

(58) Field of Classification Search
  CPC .. C08L 33/02; H01B 1/20; H01B 3/28; H01B 9/027; H01B 19/00; H01C 7/10; H01R 4/20; H02G 15/064; H02G 15/08; H02G 15/184
  USPC .............................................. 174/74 R, 84 R
  See application file for complete search history.

(56) References Cited

U.S. PATENT DOCUMENTS

| | | | |
|---|---|---|---|
| 2014/0065420 | A1 | 3/2014 | Sonerud et al. |
| 2014/0377539 | A1* | 12/2014 | Matsumoto ............. C08L 63/00 428/323 |
| 2020/0203942 | A1 | 6/2020 | Yasuda et al. |

FOREIGN PATENT DOCUMENTS

| | | |
|---|---|---|
| JP | 2000-503454 A | 3/2000 |
| JP | 2012-142377 A | 7/2012 |
| JP | 2013-212045 A | 10/2013 |
| JP | 2014-518500 A | 7/2014 |
| WO | 97/26693 A1 | 7/1997 |
| WO | 2013/004748 A2 | 1/2013 |
| WO | 2019/012885 A1 | 1/2019 |
| WO | WO-2019012885 A1 * | 1/2019 ............. H01B 17/56 |

OTHER PUBLICATIONS

Non-Ohmic Hopping Conduction_Rybicki et al. 48-65_ 1997.*
Scaling Description of Non-Ohmic DC Conduction_Nandi et al._ 1-92_Jan. 2015.*
Dec. 17, 2019 International Search Report issue din International patent Application No. PCT/JP2019/039695.

* cited by examiner

S122 Step of preparing non-ohmic composition
S124 Step of forming non-ohmic resistive layer
S126 Step of forming semi-conductive cone part
S128 Step of forming insulation layer
S140 Step of preparing power cable
S160 Step of fitting
S180 Step of inserting in insulator bushing Example Comparative Example

NON-OHMIC COMPOSITION, CABLE CONNECTION UNIT, AND METHOD FOR PRODUCING CABLE CONNECTION UNIT

FIELD OF THE INVENTION

The present disclosure relates to a non-ohmic composition, a cable connection unit, and a method for producing a cable connection unit.

The present application claims priority based on Japanese Unexamined Patent Publication No. 2019-006887 filed on Jan. 18, 2019, which is incorporated herein by reference in its entirety.

BACKGROUND OF THE INVENTION

In a cable connection structure for connecting a power cable and an overhead power transmission line, for connecting a pair of power cables, or the like, a cable connection unit having a cylindrical shape for ensuring insulation is externally fitted to the tip of the power cable that has been peeled off stepwise.

The cable connection unit is provided with, for example, a non-ohmic resistive layer including a composition containing non-ohmic particles (hereinafter, also referred to as "non-ohmic composition") in some cases. As a result, at a time of applying a high electric field, the volume resistivity of the non-ohmic resistive layer is reduced, so that the electric field can be evenly distributed (for example, Patent Document 1).

PRIOR ART DOCUMENT

Patent Document

Patent Document 1: Japanese Translation of PCT International Application Publication No. 2000-503454

SUMMARY OF THE INVENTION

According to an aspect of the present disclosure,
there is provided a non-ohmic composition including a base elastomer and a plurality of non-ohmic particles,
wherein, in a case of comparing volume resistivities $\rho$ of the non-ohmic composition within a range of $E \geq E_{th}$ for the non-ohmic composition not elongated,
the E being an electric field strength applied to the non-ohmic composition,
the $\rho$ being the volume resistivity of the non-ohmic composition, and
the $E_{th}$ being a threshold electric field strength at a point where an absolute value of a variation in a slope of log $\rho$ with respect to log E is maximum,
the volume resistivity $\rho$ for the non-ohmic composition uniaxially elongated by 50% is 50 times or less the volume resistivity $\rho$ for the non-ohmic composition not elongated.

According to another aspect of the present disclosure,
there is provided a non-ohmic composition including a base elastomer and a plurality of non-ohmic particles,
wherein $E_{th}$ for the non-ohmic composition uniaxially elongated by 50% is 1.4 times or less $E_{th}$ for the non-ohmic composition not elongated,
the $E_{th}$ being a threshold electric field strength at a point where an absolute value of a variation in a slope of log $\rho$ with respect to log E is maximum,
the E being an electric field strength applied to the non-ohmic composition, and
the $\rho$ being a volume resistivity of the non-ohmic composition.

According to yet another aspect of the present disclosure,
there is provided a non-ohmic composition including a base elastomer and a plurality of non-ohmic particles,
wherein the plurality of non-ohmic particles is dispersed like a mesh in the base elastomer.

According to yet another aspect of the present disclosure,
there is provided a cable connection unit having a cylindrical shape, in which a power cable is fitted, including:
a non-ohmic resistive layer having a cylindrical shape and including a non-ohmic composition, and
an insulation layer provided to cover an outside of the non-ohmic resistive layer;
the non-ohmic composition including a base elastomer and a plurality of non-ohmic particles,
wherein, in a case of comparing volume resistivities $\rho$ of the non-ohmic composition within a range of $E \geq E_{th}$ for the non-ohmic composition not elongated,
the E being an electric field strength applied to the non-ohmic composition,
the $\rho$ being the volume resistivity of the non-ohmic composition, and
the $E_{th}$ being a threshold electric field strength at a point where an absolute value of a variation in a slope of log $\rho$ with respect to log E is maximum,
the volume resistivity $\rho$ for the non-ohmic composition uniaxially elongated by 50% is 50 times or less the volume resistivity $\rho$ for the non-ohmic composition not elongated.

According to yet another aspect of the present disclosure,
there is provided a cable connection unit having a cylindrical shape, in which a power cable is fitted, including:
a non-ohmic resistive layer having a cylindrical shape and including a non-ohmic composition, and
an insulation layer provided to cover an outside of the non-ohmic resistive layer;
the non-ohmic composition including a base elastomer and a plurality of non-ohmic particles,
wherein the plurality of non-ohmic particles is dispersed like a mesh in the base elastomer.

According to yet another aspect of the present disclosure,
there is provided a method for producing a cable connection unit having a cylindrical shape, in which a power cable is fitted, including:
preparing a non-ohmic composition including a base elastomer and a plurality of non-ohmic particles,
forming a non-ohmic resistive layer having a cylindrical shape with the non-ohmic composition, and
forming an insulation layer to cover an outside of the non-ohmic resistive layer,
wherein, in the preparation of the non-ohmic composition, the base elastomer and the plurality of non-ohmic particles are mixed so that, in a case of comparing volume resistivities $\rho$ of the non-ohmic composition within a range of $E \geq E_{th}$ for the non-ohmic composition not elongated,
the E being an electric field strength applied to the non-ohmic composition,
the $\rho$ being the volume resistivity of the non-ohmic composition, and
the $E_{th}$ being a threshold electric field strength at a point where an absolute value of a variation in a slope of log $\rho$ with respect to log E is maximum, the volume resistivity ρ for the non-ohmic composition uniaxially elongated by 50% is 50 times or less the volume resistivity ρ for the non-ohmic composition not elongated.

According to yet another aspect of the present disclosure, there is provided a method for producing a cable connection unit having a cylindrical shape, in which a power cable is fitted, including:

preparing a non-ohmic composition including a base elastomer and a plurality of non-ohmic particles, forming a non-ohmic resistive layer having a cylindrical shape with the non-ohmic composition, and forming an insulation layer to cover an outside of the non-ohmic resistive layer, wherein, in the preparation of the non-ohmic composition, the plurality of non-ohmic particles is dispersed like a mesh in the base elastomer.

DETAILED DESCRIPTION OF THE INVENTION

Figure 1:
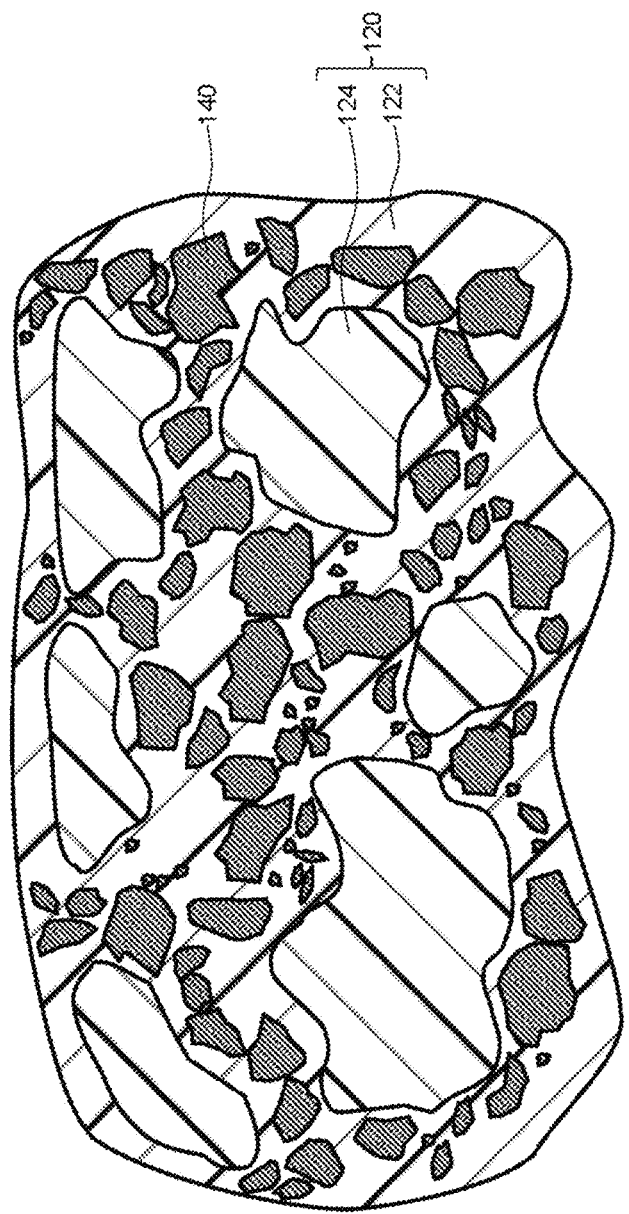
FIG. 1 is an enlarged cross-sectional diagram of a part of a non-ohmic composition according to a first embodiment of the present disclosure.

Problem to be Solved by the Disclosure

An object of the present disclosure is to provide a technique capable of enhancing a stability of a characteristic of volume resistivity with respect to an electric field strength.

Advantageous Effect of the Disclosure

According to the present disclosure, the stability of the characteristic of volume resistivity with respect to the electric field strength can be enhanced.

DESCRIPTION OF THE EMBODIMENTS OF THE DISCLOSURE

<Knowledges Obtained by the Inventors>

First, the knowledges obtained by the inventors will be described.

The cable connection unit described above has, for example, an inner diameter slightly smaller than an outer diameter of the power cable, and is externally fitted in a radially-expanded state to the power cable. At that time, the non-ohmic resistive layer formed having a cylindrical shape to cover an outer periphery of the power cable is in a state of being elongated in a circumferential direction.

The present inventors have found that the characteristic of volume resistivity with respect to the electric field strength (hereinafter also referred to as "E-ρ characteristic") in the non-ohmic composition may be changed when the non-ohmic composition forming the non-ohmic resistive layer is elongated.

Specifically, as the non-ohmic composition is elongated, stress increases to generate a gap, at an interface between the non-ohmic particles and the base elastomer. When such a gap is generated, adjacent non-ohmic particles are separated from each other and a distance between the non-ohmic particles is increased. With the distance between the non-ohmic particles being increased, a low-resistance path is less likely to be formed among the non-ohmic particles, even when the resistance of the non-ohmic particles decreases during application of a high electric field to the non-ohmic composition. Therefore, the resistance of the non-ohmic composition as a whole is maintained at a high level, and the E-ρ characteristic inherent in the non-ohmic composition cannot be obtained. Without obtaining a desired E-ρ characteristic, the electric field cannot be possibly distributed evenly in the non-ohmic resistive layer when a high electric field is locally applied. As a result, dielectric breakdown may possibly occur in the portion where a high electric field is locally applied.

On the other hand, in order to obtain a predetermined E-ρ characteristic even when the non-ohmic composition is elongated, it is conceivable to compound non-ohmic particles at a high concentration. However, when the non-ohmic particles are compounded at such a high concentration, the entanglement of molecules in the base elastomer is reduced. Therefore, the elongation characteristic and the residual elongation characteristic of the non-ohmic composition may be deteriorated.

The present inventors have intensively studied on the above-described events, and consequently found that the dispersion state of the non-ohmic particles in the base elastomer is appropriately adjusted so that the E-ρ characteristic can be stably maintained at a time of elongating the non-ohmic composition.

The present disclosure is based on the above-described knowledges found by the inventors.

Embodiments of the Disclosure

Next, embodiments of the present disclosure will be listed and described.

[1] A non-ohmic composition according to an aspect of the present disclosure includes:

a base elastomer and a plurality of non-ohmic particles, wherein, in a case of comparing volume resistivities ρ of the non-ohmic composition within a range of $E \geq E_{th}$ for the non-ohmic composition not elongated, the E being an electric field strength applied to the non-ohmic composition, the ρ being the volume resistivity of the non-ohmic composition, and the $E_{th}$ being a threshold electric field strength at a point where an absolute value of a variation in a slope of log ρ with respect to log E is maximum, the volume resistivity ρ for the non-ohmic composition uniaxially elongated by 50% is 50 times or less the volume resistivity ρ for the non-ohmic composition not elongated.

According to this configuration, the stability of the characteristic of volume resistivity with respect to the electric field strength at a time of elongating the non-ohmic composition can be enhanced.

[2] In the non-ohmic composition according to [1], the threshold electric field strength $E_{th}$ for the non-ohmic composition uniaxially elongated by 50% is 1.4 times or less the $E_{th}$ for the non-ohmic composition not elongated.

According to this configuration, the stability of the characteristic of volume resistivity with respect to the electric field strength at a time of elongating the non-ohmic composition can be enhanced.

[3] A non-ohmic composition according to another aspect of the present disclosure includes:

a base elastomer and a plurality of non-ohmic particles, wherein $E_{th}$ for the non-ohmic composition uniaxially elongated by 50% is 1.4 times or less $E_{th}$ for the non-ohmic composition not elongated, the $E_{th}$ being a threshold electric field strength at a point where an absolute value of a variation in a slope of log ρ with respect to log E is maximum, the E being an electric field strength applied to the non-ohmic composition, and the ρ being a volume resistivity of the non-ohmic composition.

According to this configuration, the stability of the characteristic of volume resistivity with respect to the electric field strength at a time of elongating the non-ohmic composition can be enhanced.

[4] In the non-ohmic composition according to any one of [1] to [3], the slope of a linear portion in a range of $E>E_{th}$ for the non-ohmic composition uniaxially elongated by 50% is within ±50% with respect to the slope of the linear portion in the range of $E>E_{th}$ for the non-ohmic composition not elongated.

According to this configuration, the stability of the characteristic of volume resistivity with respect to the electric field strength at a time of elongating the non-ohmic composition can be enhanced.

[5] In the non-ohmic composition according to any one of [1] to [4], the plurality of non-ohmic particles is dispersed like a mesh in the base elastomer.

According to this configuration, the stability of the characteristic of volume resistivity with respect to the electric field strength at a time of elongating the non-ohmic composition can be enhanced.

[6] A non-ohmic composition according to still another aspect of the present disclosure includes:

a base elastomer and a plurality of non-ohmic particles, wherein the plurality of non-ohmic particles is dispersed like a mesh in the base elastomer.

According to this configuration, the stability of the characteristic of volume resistivity with respect to the electric field strength at a time of elongating the non-ohmic composition can be enhanced.

[7] In the non-ohmic composition according to any one of [1] to [6], a coefficient of variation in a distance between the centers of gravity of the plurality of non-ohmic particles is 0.5 or more as determined by the following formula:

$$\text{Coefficient of variation} = \text{standard deviation/average value} \qquad (1).$$

According to this configuration, the variation in the characteristic of volume resistivity with respect to the electric field strength of the non-ohmic composition can be stably suppressed regardless of the elongation state of the non-ohmic composition.

[8] In the non-ohmic composition according to any one of [1] to [7], there exists a plurality of particle-free regions with no non-ohmic particles, having a diameter 1.5 times or more the mean volume diameter of the non-ohmic particles, when viewing a cross section of the non-ohmic composition.

According to this configuration, preferential deformation due to the base elastomer can be easily produced in the particle-free region when the non-ohmic composition is elongated.

[9] In the non-ohmic composition according to any one of [1] to [8], the base elastomer includes:

an elastomer (A) having relatively higher compatibility with the non-ohmic particles, and an elastomer (B) having relatively lower compatibility with the non-ohmic particles, wherein the elastomer (A) includes the non-ohmic particles more than the elastomer (B) does, and forms a sea phase, and the elastomer (B) forms an island phase.

According to this configuration, a state can be stably formed where the plurality of non-ohmic particles is dispersed like a mesh in the base elastomer.

[10] In the non-ohmic composition according to [9], the difference between a solubility parameter of the elastomer (A) and a solubility parameter of the elastomer (B) is 0.5 $(\text{cal/cm}^3)^{1/2}$ or more.

According to this configuration, a state can be stably formed where the plurality of non-ohmic particles is dispersed like a mesh in the base elastomer.

[11] In the non-ohmic composition according to [9], the elastomer (A) is non-crosslinked, and the elastomer (B) contains a crosslinked rubber.

According to this configuration, the non-ohmic particles can be dispersed preferentially in the elastomer (A).

[12] In the non-ohmic composition according to [9], the elastomer (A) contains a rubber, the elastomer (B) contains a thermoplastic elastomer, and a melting point of the elastomer (B) is higher than a softening point of the elastomer (A).

According to this configuration, the non-ohmic particles can be dispersed preferentially in the elastomer (A).

[13] In the non-ohmic composition according to [9], the elastomer (A) and the non-ohmic particles occupy 30% or more of a total volume of the non-ohmic composition.

According to this configuration, the elastomer (A) can continuously form a sea phase while the elastomer (B) can discretely form island phases.

[14] In the non-ohmic composition according to [9], the elastomer (A) and the elastomer (B) are chemically bonded to each other.

According to this configuration, a decrease in interfacial strength due to a difference in the solubility parameter between the elastomer (A) and the elastomer (B) can be suppressed.

[15] A cable connection unit according to yet another aspect of the present disclosure is
a cable connection unit having a cylindrical shape, in which a power cable is fitted, including:
a non-ohmic resistive layer having a cylindrical shape and including a non-ohmic composition, and
an insulation layer provided to cover an outside of the non-ohmic resistive layer,
the non-ohmic composition including a base elastomer and a plurality of non-ohmic particles,
wherein, in a case of comparing volume resistivities ρ of the non-ohmic composition within a range of E≥$E_{th}$ for the non-ohmic composition not elongated,
the E being an electric field strength applied to the non-ohmic composition,
the ρ being the volume resistivity of the non-ohmic composition, and
the $E_{th}$ being a threshold electric field strength at a point where an absolute value of a variation in a slope of log ρ with respect to log E is maximum,
the volume resistivity ρ for the non-ohmic composition uniaxially elongated by 50% is 50 times or less the volume resistivity ρ for the non-ohmic composition not elongated.

According to this configuration, the stability of the characteristic of volume resistivity with respect to the electric field strength at a time of elongating the non-ohmic composition can be enhanced.

[16] A cable connection unit according to yet another aspect of the present disclosure is
a cable connection unit having a cylindrical shape, in which a power cable is fitted, including:
a non-ohmic resistive layer having a cylindrical shape and including a non-ohmic composition, and
an insulation layer provided to cover an outside of the non-ohmic resistive layer;
the non-ohmic composition including a base elastomer and a plurality of non-ohmic particles,
wherein the plurality of non-ohmic particles is dispersed like a mesh in the base elastomer.

According to this configuration, the stability of the characteristic of volume resistivity with respect to the electric field strength at a time of elongating the non-ohmic composition can be enhanced.

[17] A method for producing a cable connection unit according to yet another aspect of the present disclosure is
a method for producing a cable connection unit having a cylindrical shape, in which a power cable is fitted, including:
preparing a non-ohmic composition including a base elastomer and a plurality of non-ohmic particles,
forming a non-ohmic resistive layer having a cylindrical shape with the non-ohmic composition, and
forming an insulation layer to cover an outside of the non-ohmic resistive layer,
wherein, in the preparation of the non-ohmic composition, the base elastomer and the plurality of non-ohmic particles are mixed so that, in a case of comparing volume resistivities ρ of the non-ohmic composition within a range of E≥$E_{th}$ for the non-ohmic composition not elongated,
the E being an electric field strength applied to the non-ohmic composition,
the ρ being the volume resistivity of the non-ohmic composition, and
the $E_{th}$ being a threshold electric field strength at a point where an absolute value of a variation in a slope of log ρ with respect to log E is maximum,
the volume resistivity ρ for the non-ohmic composition uniaxially elongated by 50% is 50 times or less the volume resistivity ρ for the non-ohmic composition not elongated.

According to this configuration, the stability of the characteristic of volume resistivity with respect to the electric field strength at a time of elongating the non-ohmic composition can be enhanced.

[17] A method for producing a cable connection unit according to yet another aspect of the present disclosure is
a method for producing a cable connection unit having a cylindrical shape, in which a power cable is fitted, including:
preparing a non-ohmic composition including a base elastomer and a plurality of non-ohmic particles,
forming a non-ohmic resistive layer having a cylindrical shape with the non-ohmic composition, and
forming an insulation layer to cover an outside of the non-ohmic resistive layer,
wherein, in the preparation of the non-ohmic composition, the plurality of non-ohmic particles is dispersed like a mesh in the base elastomer.

According to this configuration, the stability of the characteristic of volume resistivity with respect to the electric field strength at a time of elongating the non-ohmic composition can be enhanced.

DETAILS OF EMBODIMENTS OF THE DISCLOSURE

Next, an embodiment of the present disclosure will be described below with reference to the drawings. The present invention is not limited to these illustrations, but intended to be indicated by claims and encompass all the changes which fall within the meaning and scope equivalent to claims.

First Embodiment of the Disclosure (1) Non-Ohmic Composition (Elastomer Composition)

The non-ohmic composition of this embodiment is, for example, a material which forms the non-ohmic resistive layer 220 of the cable connection unit 10 described later, and is characterized in that the volume resistivity decreases non-linearly as the electric field strength increases.

Now, the configuration of the non-ohmic composition will be explained with reference to FIG. 1. FIG. 1 is an enlarged cross-sectional diagram of a part of the non-ohmic composition according to this embodiment.

As illustrated in FIG. 1, the non-ohmic composition of this embodiment has, for example, the base elastomer 120 and the plurality of non-ohmic particles 140. The base elastomer 120 means, for example, an elastomer component which forms a main component of the non-ohmic composition, and forms a matrix (mother phase) of the non-ohmic composition. The non-ohmic particles 140 are configured as, for example, ceramic-based particles (so-called varistor particles) characterized in that the volume resistivity decreases non-linearly as the electric field strength increases.

In this embodiment, the non-ohmic particles 140 are dispersed like a mesh in the base elastomer 120. The phrase "dispersed like a mesh" as used herein means, for example, that particle-free regions, each containing no particles and having a range wider than a size of a single particle, are discretely distributed among particle group regions including particles, in which the closest particles continue like a string of beads. Each particle-free region is a region closed by the particle group region, and is discontinuously separated from other adjacent particle-free regions by the particle group region.

Since the non-ohmic particles 140 are dispersed like a mesh as described above, the elasticity inherent in the base elastomer 120 can be maintained in the particle-free region existing outside the particle group region having a mesh-like shape. On the other hand, in the particle group region, stress can be relaxed and the generation of gaps can be suppressed, at the interface between the base elastomer 120 and the non-ohmic particles 140. Thereby, a low resistance path can be stably formed among the non-ohmic particles at a time of applying a high electric field to the non-ohmic composition. As a result, the E-ρ characteristic inherent in the non-ohmic composition can be stably maintained even when the non-ohmic composition is elongated.

Specifically, a coefficient of variation (CV) in a distance between the centers of gravity of the non-ohmic particles 140 is, for example, 0.5 or more in this embodiment. The "coefficient of variation (CV)" in this context can be determined by the following formula (1).

Coefficient of variation (CV)=standard deviation/ average value (1).

The term "the distance between the centers of gravity" as used herein means a distance between the centers of gravity of a plurality of adjacent particles. The distance between the centers of gravity is measured, for example, by an image analysis method. More specifically, the distance between the centers of gravity is measured, for example, as a distance between the centers of gravity of a plurality of adjacent non-ohmic particles 140 on a cross-sectional image observed by a Scanning Electron Microscope (SEM) at 2,000× magnification. The term "adjacent particles" used herein means particles of interest with no other particles existing on the straight line connecting their centers of gravity.

A state where the coefficient of variation in a distance between the centers of gravity of the non-ohmic particles 140 is less than 0.5 corresponds to a state where the above-described particle-free regions are small and the non-ohmic particles 140 are evenly dispersed.

In this case, when the non-ohmic composition is elongated, the stress is applied evenly throughout the non-ohmic composition. Therefore, stress increases to generate a gap, at the interface between the non-ohmic particles and the base elastomer. As a result, the E-ρ characteristic of the non-ohmic composition may vary depending on the elongation state of the non-ohmic composition. In contrast, in this embodiment, with the coefficient of variation in the distance between the centers of gravity of the non-ohmic particles 140 being 0.5 or more, a state can be stably formed where the above-described non-ohmic particles 140 are dispersed like a mesh in the base elastomer 120. Thereby, stress can be easily relaxed, and the generation of gaps can be stably suppressed, at the interface between the base elastomer 120 and the non-ohmic particles 140. As a result, the variation in the E-ρ characteristic of the non-ohmic composition can be stably suppressed regardless of the elongation state of the non-ohmic composition.

On the other hand, in this embodiment, the coefficient of variation in the distance between the centers of gravity of the non-ohmic particles 140 is preferably 0.8 or less, for example. The state where the coefficient of variation in the distance between the centers of gravity of the non-ohmic particles 140 is more than 0.8 corresponds to a state where an opening of the mesh formed by the non-ohmic particles 140 in the base elastomer 120 becomes larger, so that the particle-free regions are continuously distributed, or a state where the non-ohmic particles 140 are dispersed as aggregates in the base elastomer 120. In this case, the number of chains of the non-ohmic particles 140 formed by the contact between the non-ohmic particles 140, may be insufficient. As a result, the non-ohmic characteristic of the non-ohmic composition may not be developed. In contrast, in this embodiment, the coefficient of variation in the distance between the centers of gravity of the non-ohmic particles 140 being 0.8 or less can suppress the mesh formed by the non-ohmic particles 140 in the base elastomer 120 from becoming excessively large and the particle-free regions from being continuously distributed. Alternatively, the non-ohmic particles 140 may be suppressed from being dispersed as aggregates in the base elastomer 120. Thereby, the non-ohmic characteristic of the non-ohmic composition can be stably developed.

In this embodiment, for example, there exists a plurality of particle-free regions with no non-ohmic particles 140, each having a diameter 1.5 times or more the mean volume diameter of the non-ohmic particles 140 when viewing a cross-section of the non-ohmic composition. With the diameter of the particle-free region being less than 1.5 times the mean volume diameter of the non-ohmic particles 140 in a cross-sectional view, preferential deformation due to the base elastomer 120 in particle-free regions is less likely to occur when the non-ohmic composition is elongated. Therefore, a gap may be generated at the interface between the non-ohmic particles and the base elastomer, in the particle group region. As a result, it may be less likely to obtain an effect of suppressing variation in the E-ρ characteristic of the non-ohmic composition. In contrast, in this embodiment, since the diameter of the particle-free region is ensured to be 1.5 times or more the mean volume diameter of the non-ohmic particles 140 in a cross-sectional view, preferential deformation due to the base elastomer 120 in the particle-free region can be easily produced when the non-ohmic composition is elongated. Thereby, the generation of gaps can be stably suppressed at the interface between the base elastomer 120 and the non-ohmic particles 140. As a result, the effect of suppressing variation in the E-ρ characteristic of the non-ohmic composition can be stably obtained.

The term, "mean volume diameter (MV)" used herein is determined by the following formula:

$$MV = \Sigma(V_i d_i)/\Sigma V_i$$

wherein $d_i$ is a particle diameter of a particle and $V_i$ is a particle volume.

For a measurement of the mean volume diameter, a dynamic light scattering-type particle diameter/particle size distribution measuring device may be used.

The upper limit of the size of the particle-free region in a cross-sectional view is not particularly limited. For example, the diameter of the particle-free region in a cross-sectional view is preferably 10 times or less the mean volume diameter of the non-ohmic particles 140, from the viewpoint of suppressing variation in stress at a time of elongation.

In this embodiment, since a state is formed where the non-ohmic particles 140 are dispersed like a mesh in the base elastomer 120 as described above, the non-ohmic composition has, for example, a phase-separated structure.

Specifically, the base elastomer 120 includes, for example, the elastomer (A) 122 which has relatively higher compatibility (difference in the solubility parameter described later is small) with the non-ohmic particles 140, and the elastomer (B) 124 which has relatively lower compatibility (difference in the solubility parameter is large) with the non-ohmic particles 140. That is, the compatibilities of the elastomer (A) 122 and the elastomer (B) 124 with the non-ohmic particles 140 are different from each other, so that the phase-separated structure can be formed.

Since the elastomer (A) 122 has relatively higher compatibility with the non-ohmic particles 140, the elastomer (A) contains more non-ohmic particles 140 than the elastomer (B) 124 does. Further, the elastomer (A) 122 forms, for example, a sea phase (continuous phase) while containing the non-ohmic particles 140. That is, the sea phase formed by the elastomer (A) 122 includes, for example, the above-described particle group region.

On the other hand, the elastomer (B) 124 forms, for example, an island phase (dispersed phase). Since the island phase formed by the elastomer (B) 124, for example, has relatively lower compatibility with the non-ohmic particles 140, the elastomer (B) includes the above-described particle-free region. It is preferred that the entirety of the island phase is a particle-free region. At least a part of the island phase may include the non-ohmic particles 140. In this case, the non-ohmic particle 140 included in the island phase is preferably smaller than the non-ohmic particle 140 included in the above-described sea phase.

The sea phase formed by the elastomer (A) 122 and the island phase formed by the elastomer (B) 124 can form a state where the non-ohmic particles 140 are dispersed like a mesh in the base elastomer 120, as described above.

For example, the elastomer (A) 122 and the elastomer (B) 124 of this embodiment have distinct solubility parameters.

The "solubility parameter (SP value)" is a value defined according to the regular solution theory introduced by Hildebrand, and is a measure for the solubility of the two components. The solubility parameter is calculated from the square root $(cal/cm^3)^{1/2}$ of the heat of vaporization required for 1 $cm^3$ of liquid to evaporate. The solubility parameter can be obtained by the Fedors method (Polymer Engineering and Science, Vol. 14, P 152). A small difference in the solubility parameter between the two components means that the two components are highly compatible with each other.

In this embodiment, the difference between the solubility parameter of the elastomer (A) 122 and the solubility parameter of the elastomer (B) 124 is, for example, 0.5 $(cal/cm^3)^{1/2}$ or more, preferably 1.0 $(cal/cm^3)^{1/2}$ or more. When the difference in the solubility parameter is less than 0.5 $(cal/cm^3)^{1/2}$, it becomes difficult to form a phase-separated structure. In contrast, in this embodiment, since the difference of the solubility parameter is 0.5 $(cal/cm^3)^{1/2}$ or more, the phase-separated structure can be stably formed. Accordingly, a state can be stably formed where the plurality of non-ohmic particles 140 is dispersed like a mesh in the base elastomer 120. Furthermore, with the difference in the solubility parameter being 1.0 $(cal/cm^3)^{1/2}$ or more, a state can be more stably formed where the non-ohmic particles 140 are dispersed like a mesh in the base elastomer 120.

The upper limit of the difference between the solubility parameter of the elastomer (A) 122 and the solubility parameter of the elastomer (B) 124 is not particularly limited, but is desirably 2.5 $(cal/cm^3)^{1/2}$, for example. With the difference in the solubility parameter being more than 2.5 $(cal/cm^3)^{1/2}$, delamination is likely to occur at the interface between the elastomer (A) 122 and the elastomer (B) 124, and mechanical characteristic may not be developed, when the non-ohmic composition is elongated.

In this embodiment, the solubility parameter of the elastomer (B) 124, the solubility parameter of the elastomer (A) 122, and the solubility parameter of the non-ohmic particles 140 are preferably larger in this order.

Specifically, the solubility parameter of the non-ohmic particle 140 is, for example, 12.0 $(cal/cm^3)^{1/2}$ or more and 20.0 $(cal/cm^3)^{1/2}$ or less. The solubility parameter of the elastomer (A) 122 is, for example, 8.0 $(cal/cm^3)^{1/2}$ or more and 11.5 $(cal/cm^3)^{1/2}$ or less. The solubility parameter of the elastomer (B) 124 is, for example, 7.0 $(cal/cm^3)^{1/2}$ or more and 9.0 $(cal/cm^3)^{1/2}$ or less. Each material is selected so that each of these solubility parameters satisfies the above-described magnitude relationship within the above-described range. Thereby, the above-described phase-separated structure can be stably formed.

In this embodiment, the elastomer (A) 122 and the non-ohmic particles 140 occupy 30% or more of a total volume of the non-ohmic composition, for example. When the elastomer (A) 122 and the non-ohmic particles 140 occupy less than 30% of the total volume of the non-ohmic composition, the elastomer (A) is discretely distributed and thus a sea phase is not formed. Accordingly, it is difficult to form a state where the plurality of non-ohmic particles 140 is dispersed like a mesh in the base elastomer 120. In contrast, in this embodiment, the elastomer (A) 122 and the non-ohmic particles 140 occupying 30% or more of the total volume of the non-ohmic composition allows continuous formation of sea phase by the elastomer (A) 122 while island phases are discretely formed by the elastomer (B) 124. Accordingly, a state can be stably formed where the plurality of non-ohmic particles 140 is dispersed like a mesh in the base elastomer 120. As a result, the effect of suppressing variation in the E-ρ characteristic of the non-ohmic composition can be stably obtained.

On the other hand, in this embodiment, the elastomer (A) 122 and the non-ohmic particles 140 preferably occupy 70% or less of the total volume of the non-ohmic composition, for example. When the elastomer (A) 122 and the non-ohmic particles 140 occupy more than 70% of the total volume of the non-ohmic composition, the island phase formed by the elastomer (B) becomes excessively small. Therefore, when the non-ohmic composition is elongated, preferential deformation due to the elastomer (B) is less likely to occur. As a result, it may be difficult to obtain an effect of suppressing variation in the E-ρ characteristic of the non-ohmic composition. In contrast, in this embodiment, with the elastomer (A) 122 and the non-ohmic particles 140 occupying 70% or less of the total volume of the non-ohmic composition, the island phase formed by the elastomer (B) can be suppressed from becoming excessively small. Thereby, preferential deformation due to the elastomer (B) can be easily produced when the non-ohmic composition is elongated. As a result, the effect of suppressing variation in the E-ρ characteristic of the non-ohmic composition can be stably obtained.

Moreover, the elastomer (A) 122 and the elastomer (B) 124 are, for example, chemically bonded to each other in this embodiment. The elastomer (A) 122 and the elastomer (B) 124 are crosslinked with a crosslinking agent, for example, at least one of sulfur and an organic peroxide. Thereby, a decrease in interfacial strength due to a difference in the solubility parameter between the elastomer (A) 122 and the elastomer (B) 124 can be suppressed. As a result, the residual elongation of the non-ohmic composition can be reduced and the stress relaxation over a long period of time can be suppressed.

Moreover, the elastomer (A) 122 and the elastomer (B) 124, for example, each has insulation in this embodiment. Specifically, each of the elastomer (A) 122 and the elastomer (B) 124 has the volume resistivity of, for example, $1.0 \times 10^9$ Ω-cm or more. Therefore, a predetermined insulation of the non-ohmic composition can be obtained when a low electric field is applied.

For example, an elastic modulus of the elastomer (B) 124 is preferably lower than an elastic modulus of the elastomer (A) 122 in this embodiment. Thereby, preferential deformation due to the elastomer (B) can be easily produced and the concentration of stress in the elastomer (A) can be suppressed, when the non-ohmic composition is elongated.

Examples of the elastomer (A) satisfying the above-described conditions include ethylene propylene rubber (EPR), ethylene propylene diene rubber (EPDM), styrene butadiene rubber (SBR), epichlorohydrin rubber (CO), chloroprene rubber (CR), chlorosulfonated polyethylene rubber (CSM), nitrile rubber (NBR), acrylic rubber (ACM), ethylene acrylic rubber (AEM), ethylene vinyl acetate copolymer (EVM), and urethane rubber (U).

Further, examples of the elastomer (B) that satisfies the above-described conditions include fluororubber (FKM), silicone rubber (Q), ethylene propylene rubber (EPR), ethylene propylene diene rubber (EPDM), styrene butadiene rubber (SBR), epichlorohydrin rubber (CO), and chloroprene rubber (CR).

The elastomer such as EPR, EPDM, SBR, CO, CR that satisfies both conditions of the above-described elastomers (A) and (B) can form either a sea phase rich in the non-ohmic particles 140 or an island phase including the particle-free region, depending on the counterpart elastomer.

Specifically, EPDM (SP value: 8.0) can be used as the elastomer (A) when the silicone rubber (SP value: 7.3) is used as the elastomer (B), for example. It can be used as the elastomer (B) when an elastomer (such as U) with a higher SP value is used as the elastomer (A).

Further, the non-ohmic particles 140 used in this embodiment has, for example, a crystal part and the grain boundary part. When an electric field equal to or lower than the critical electric field strength is applied, the grain boundary part exhibits high resistance. Thus, the non-ohmic particle 140 acts as an insulator. On the other hand, when an electric field more than the critical electric field strength is applied, a current flows through the grain boundary part between a pair of adjacent crystal parts. Thus, the non-ohmic particle 140 acts as a conductor.

The crystal part of the non-ohmic particle 140 includes, for example, at least any one of zinc oxide, silicon carbide, strontium titanate, and barium titanate. When the crystal part of the non-ohmic particle 140 includes mainly zinc oxide, the grain boundary part of the non-ohmic particle 140 includes, for example, an oxide containing at least one of bismuth, antimony, manganese, cobalt, and nickel.

In this embodiment, a maximum particle size of the non-ohmic particle 140 is not particularly limited, and is, for example, 30 μm or less, and preferably 10 μm or less. With the maximum particle size of the non-ohmic particle 140 being 30 μm or less, the dielectric breakdown electric field strength of the non-ohmic composition can be enhanced.

Further, with the maximum particle size of the non-ohmic particle 140 being 30 μm or less, the dielectric breakdown electric field strength of the non-ohmic composition can be stably enhanced. The lower limit of the maximum particle size of the non-ohmic particle 140 is not particularly limited, and is 1.5 μm from the viewpoint of stably obtaining the desired non-ohmic characteristic.

Further, in this embodiment, the compounding amount of the non-ohmic particles 140 in the non-ohmic composition is appropriately adjusted according to the characteristics required for the non-ohmic composition. Specifically, the compounding amount of the non-ohmic particles 140 is preferably 0.1 or more and 0.5 or less in terms of the volume ratio with respect to the base elastomer 120, for example. With the compounding amount of the non-ohmic particles 140 being 0.1 or more in terms of volume ratio with respect to the base elastomer 120, a predetermined E-ρ characteristic of the non-ohmic composition can be stably obtained. On the other hand, with the compounding amount of the non-ohmic particles 140 being 0.5 or less in terms of volume ratio with respect to the base elastomer, a predetermined tensile characteristic of the non-ohmic composition can be stably obtained.

Further, in this embodiment, the non-ohmic particles 140 may be surface-treated, for example, with a silane coupling agent. Specifically, as the silane coupling agent, for example, trimethoxyvinyl silane, triethoxyvinyl silane, methyldimethoxyvinylsilane, and the like can be used. Thereby, the dispersibility in the elastomer (A) 122 can be adjusted, and a particle-free region can be effectively formed. As a result, a predetermined E-ρ characteristic of the non-ohmic composition can be developed.

Other additives may be appropriately compounded into the non-ohmic composition. For example, a crosslinking agent, an antioxidant, a plasticizer, and the like can be used.

(Characteristics of Non-Ohmic Composition)

Figure 2:
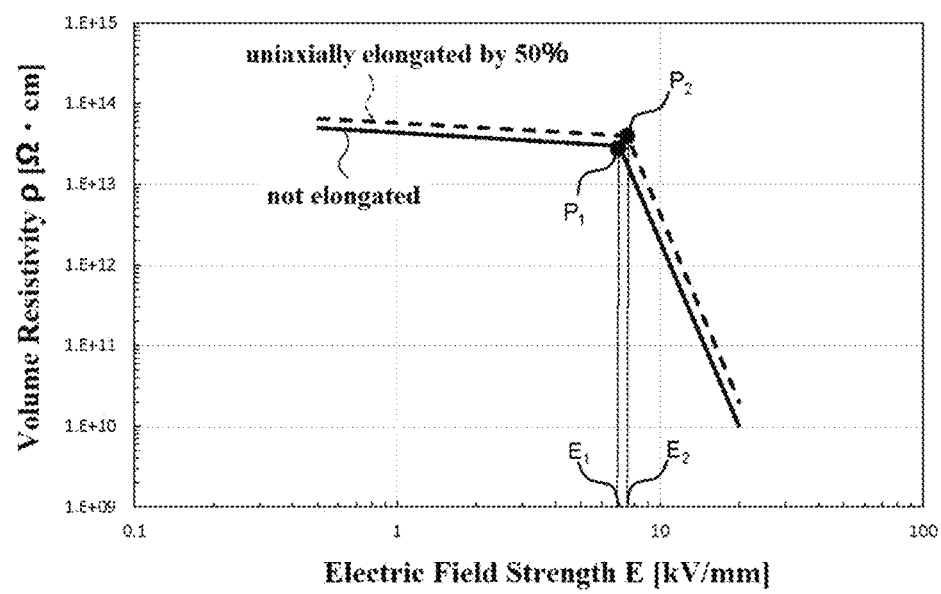
FIG. 2 is a diagram illustrating an example of a volume resistivity with respect to an electric field strength in the non-ohmic composition according to the first embodiment of the present disclosure.

Next, the characteristics exhibited by the non-ohmic composition of this embodiment will be described with reference to FIG. 2. FIG. 2 is a diagram illustrating an example of a volume resistivity with respect to an electric field strength in the non-ohmic composition according to this embodiment.

In this specification, the electric field strength is denoted by E and the volume resistivity is denoted by ρ. The point at which an absolute value of a variation in a slope of log ρ with respect to log E is maximum is considered as a "starting point of decline", and a starting point of decline for the non-ohmic composition not elongated is denoted by "$P_1$", and a starting point of decline for the non-ohmic composition uniaxially elongated by 50% is denoted by "$P_2$". The phrase "slope of log ρ with respect to log E" used herein can be rephrased as "slope of ρ with respect to E on a double logarithmic plot of E and ρ". In addition, an electric field strength E at the starting point of decline is considered as a "threshold electric field strength $E_{th}$"; a threshold electric field strength $E_{th}$ at the starting point of decline $P_1$ for the non-ohmic composition not elongated is denoted by "$E_1$"; and a threshold electric field strength $E_{th}$ at the starting point of decline $P_2$ for the non-ohmic composition uniaxially elongated by 50% is denoted by "$E_2$".

In this embodiment, as described above, the non-ohmic particles 140 are dispersed like a mesh in the base elastomer 120, so that even when the non-ohmic composition is elongated, the E-ρ characteristic inherent in the non-ohmic composition can be stably maintained.

Specifically, as illustrated in FIG. 2, in a case of comparing volume resistivities ρ of the non-ohmic composition within a range of $E \geq E_1$ for the non-ohmic composition not elongated, the volume resistivity ρ for the non-ohmic composition uniaxially elongated by 50% is 50 times or less, preferably 20 times or less, with respect to the volume resistivity ρ for the non-ohmic composition not elongated in this embodiment.

In this embodiment, the threshold electric field strength $E_2$ at the starting point of decline $P_2$ for the non-ohmic composition uniaxially elongated by 50% is, for example, 1.4 times or less, preferably 1.2 times or less, with respect to the threshold electric field strength $E_1$ at the starting point of decline $P_1$ for the non-ohmic composition not elongated.

The lower limit of a ratio of $E_2$ to $E_1$ is not particularly limited, and the ratio of $E_2$ to $E_1$ is preferably 0.6 times or more, more preferably, 0.8 times or more, and still more preferably, 1.0 times or more, for example.

In this embodiment, a slope of a linear portion in a range of $E>E_2$ for the non-ohmic composition uniaxially elongated by 50% is within ±50%, preferably within ±30%, with respect to a slope of a linear portion in a range of $E>E_1$ for the non-ohmic composition not elongated.

The phrase "slope of a linear portion in a range of $E>E_{th}$" used herein means, for example, the slope in a range where the correlation coefficient is −0.99 or less when approximated by the least-squares method from a plurality of consecutive measurement points in the range of $E>E_{th}$. The upper limit of E when determining the "slope of a linear portion in a range of $E>E_{th}$" is arbitrary and is not limited, but is, for example, $3E_{th}$, preferably $2E_{th}$.

(2) Cable Connection Unit

Figure 3:
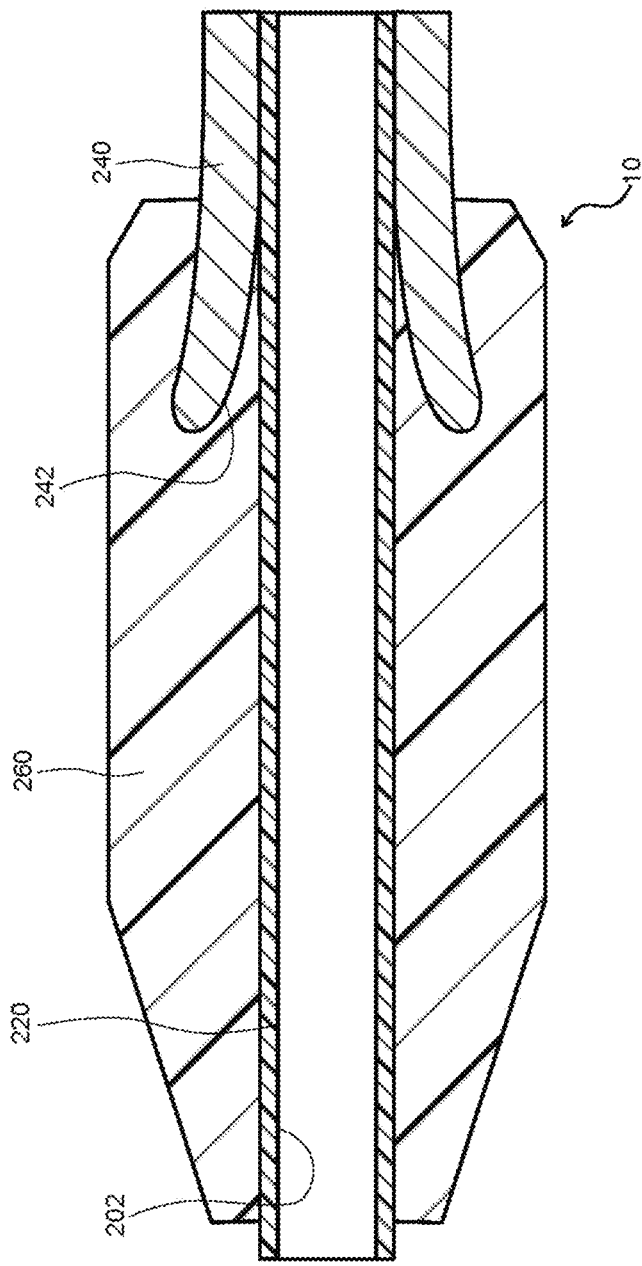
FIG. 3 is a cross-sectional diagram illustrating a cable connection unit according to the first embodiment of the present disclosure.

With reference to FIG. 3, a cable connection unit according to this embodiment will be described. FIG. 3 is a cross-sectional diagram illustrating the cable connection unit according to this embodiment.

Hereinafter, an "axial direction" of a power cable (not shown) or a cable connection unit 10 refers to a direction of a central axis of the power cable or the cable connection unit 10, which may be rephrased as a "direction along the layer" or a "longitudinal direction". Note that the axial direction of the cable connection unit 10 can also be rephrased as an axial direction of a hollow part 202. The term "radial direction" of the power cable or the cable connection unit 10 refers to a direction from a central axis toward an outer periphery of the power cable or the cable connection unit 10, which may be rephrased as a "thickness direction" or a "shorter direction" in some cases.

Hereinafter, among ends in the axial direction of the cable connection unit 10, an end on which a tip of the power cable is placed is referred to as a "tip" and an end on the opposite side (extending side) to the tip of the power cable is referred to as a "rear end".

As illustrated in FIG. 3, the cable connection unit (unit for cable termination connection) 10 of this embodiment is configured having a cylindrical shape, for example, in which the power cable can be fitted. Thereby, the electric field outside the power cable can be relaxed, and the insulation can be secured.

The cable connection unit 10 of this embodiment is configured to be used, for example, in a cable termination connection structure (air termination connection) that connects the power cable to an overhead transmission line (not shown) or the like. In the cable termination connection structure, for example, the power cable is inserted into an insulator bushing (not shown) while the cable connection unit 10 is externally fitted to the outer periphery of the power cable that has been peeled off stepwise, and the insulator bushing is filled with an insulating medium. The insulating medium is, for example, insulating oil or insulating gas.

The power cable used herein is configured as a so-called CV cable (crosslinked polyethylene insulated PVC sheathed cable, also referred to as an XLPE cable), which includes; for example, from the central axis to the outer periphery, a cable conductor (not shown), a cable internal semi-conductive layer (not shown), a cable insulation layer (not shown), a cable external semi-conductive layer (not shown), a cable metal sheath (not shown), and a cable sheath (not shown).

As illustrated in FIG. 3, the cable connection unit 10 of this embodiment includes, for example, the non-ohmic resistive layer (FGM layer: Field Grading Material Layer) 220, the semi-conductive cone part (semi-conductive part, stress cone part) 240, and the insulation layer 260.

(Non-Ohmic Resistive Layer)

The non-ohmic resistive layer 220 includes, for example, the non-ohmic composition including the base elastomer 120 and the plurality of non-ohmic particles 140 described above. In the non-ohmic resistive layer 220, the elastomer (A) 122 and the elastomer (B) 124 are chemically bonded to each other via crosslinking.

The non-ohmic resistive layer 220 is provided, for example, having a cylindrical shape to form the hollow part 202. The non-ohmic resistive layer 220 is provided, for example, along the entire length in the axial direction of the cable connection unit 10, and is configured to cover the outer periphery of each of the exposed cable insulation layer and the exposed cable external semi-conductive layer of the power cable when the power cable is fitted within the hollow part 202.

The inner diameter of the hollow part 202 configured by the non-ohmic resistive layer 220 is, for example, slightly smaller than the outer diameter of the power cable. The non-ohmic resistive layer 220, in a radially-expanded state, is externally fitted to the power cable, and thus elongated circumferentially. Thereby, the power cable is fitted elastically within the hollow part 202, and the power cable is adhered airtightly to the inner periphery surface of the non-ohmic resistive layer 220.

A rear end side of the cable connection unit 10 of the non-ohmic resistive layer 220 is brought into contact with the cable external semi-conductive layer when the power cable is fitted within the hollow part 202. Therefore, the rear end side of the cable connection unit is grounded. On the other hand, the tip side of the cable connection unit 10 of the non-ohmic resistive layer 220 is almost at the same potential as that of the cable conductor of the power cable, that is, at a high potential.

In this embodiment, the non-ohmic resistive layer 220 is arranged to form the hollow part 202 and cover the cable insulation layer. Accordingly, the resistance of the non-ohmic resistive layer 220 can be reduced when a local electric field concentration occurs at a point where the cable insulation layer of the power cable, the insulation layer 260 of the cable connection unit 10, and the insulating medium filled in the insulator bushing come into close proximity (also referred to as a triple point), on the tip side of the cable connection unit 10. Thereby, the equipotential lines can be evenly distributed (dispersed) within the non-ohmic resistive layer 220 from the tip side toward the rear end side of the cable connection unit 10 when viewing a cross section along the axial direction of the cable connection unit 10. As a result, the electric field concentration at the tip side of the cable connection unit 10 can be relaxed and electrical risks such as dielectric breakdown can be reduced.

(Semi-Conductive Cone Part)

The semi-conductive cone part 240 has, for example, semi-conductivity. Specifically, the semi-conductive cone part 240 contains, for example, a semi-conductive rubber. The semi-conductive rubber is, for example, a composition having an ethylene propylene rubber or a silicone rubber, and carbon black.

The semi-conductive cone part 240 is formed, for example, having a conical shape (trumpet shape) to form a so-called stress cone. Specifically, the semi-conductive cone part 240 is, for example, provided outside the non-ohmic resistive layer 220 in the radial direction of the cable connection unit 10. For example, the rear end side of the semi-conductive cone part 240 in the axial direction of the cable connection unit 10 may be in contact with or away from the non-ohmic resistive layer 220. Further, the semi-conductive cone part 240 has an inclined surface 242 that is inclined so as to be gradually separated from the non-ohmic resistive layer 220, from the portion close to the non-ohmic resistive layer 220 toward the tip side in the axial direction of the cable connection unit 10. Thereby, equipotential lines can be formed along the inclined surface 242 of the semi-conductive cone part 240, and the equipotential lines can be evenly distributed, when viewing the cross section along the axial direction of the cable connection unit 10.

(Insulation Layer)

The insulation layer 260 has an insulation higher than that of the semi-conductive cone part 240, for example. Specifically, the insulation layer 260 contains, for example, an insulating rubber. The insulating rubber is, for example, an ethylene propylene rubber or a silicone rubber.

The insulation layer 260 is provided to cover the non-ohmic resistive layer 220 and the semi-conductive cone part 240. The insulation layer 260 is provided, for example, to be intercalated between the non-ohmic resistive layer 220 and the inclined surface 242 of the semi-conductive cone part 240.

Further, the insulation layer 260 is, for example, gradually reduced in diameter toward the tip in the axial direction of the cable connection unit 10. In addition to the fact that the non-ohmic resistive layer 220 is provided as described above, the tip of the insulation layer 260 of the cable connection unit 10 is gradually reduced in diameter, so that the electric field at the triple point can be further relaxed.

The non-ohmic resistive layer 220, the semi-conductive cone part 240, and the insulation layer 260, described above, are molded so as to be integrally bonded together, for example. This makes it possible to facilitate the operation at the site where the cable connection structure is produced (constructed). On site, it is possible to suppress the formation of voids between each layer and the incorporation of impurities between each layer. Note that the non-ohmic resistive layer 220, the semi-conductive cone part 240, and the insulation layer 260 may be separated.

(3) Method for Producing Cable Connection Unit and Method for Producing Cable Connection Structure (Method for Connecting Cables)

Figure 4:
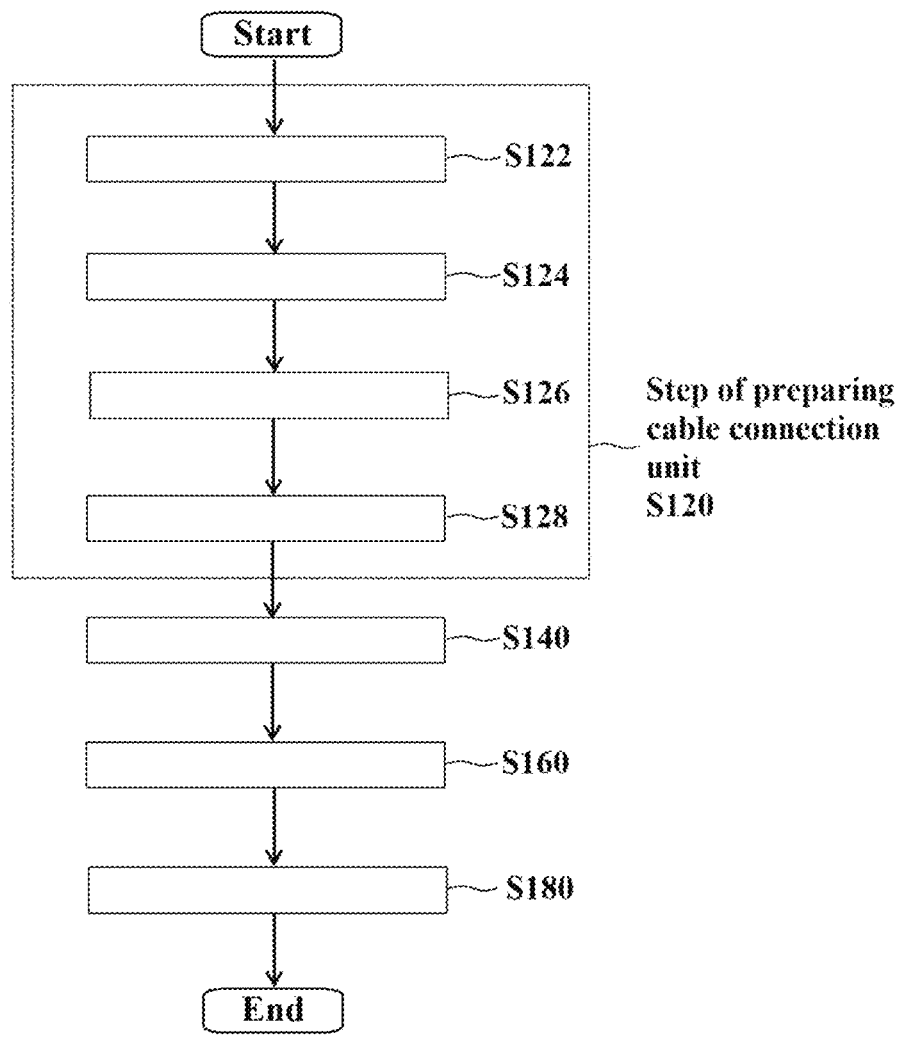
FIG. 4 is a flow chart illustrating a method for producing a cable connection structure according to the first embodiment of the present disclosure.

Next, a method for producing the cable connection unit according to this embodiment and a method for producing the cable connection structure according to this embodiment will be described with reference to FIG. 4. FIG. 4 is a flow chart illustrating a method for producing a cable connection structure according to this embodiment. Hereinafter, the step is abbreviated as "S".

A method for producing the cable connection structure of this embodiment includes, for example, a step of fabricating cable connection unit (a step of producing cable connection unit) S120, a step of preparing power cable S140, a step of fitting S160, and a step of inserting in insulator bushing S180.

(S120: Step of Fabricating Cable Connection Unit)

First, a cable connection unit 10 having a cylindrical shape and including the non-ohmic resistive layer 220, the semi-conductive cone part 240, and the insulation layer 260 is fabricated. The step of fabricating cable connection unit S120 includes, for example, a step of preparing non-ohmic composition S122, a step of forming non-ohmic resistive layer S124, a step of forming semi-conductive cone part S126, and a step of forming insulation layer S128.

(S122: Step of Preparing Non-Ohmic Composition)

First, the base elastomer 120 and the non-ohmic particles 140 are prepared.

In this embodiment, as the base elastomer 120, for example, the elastomer (A) 122 which has relatively higher compatibility with the non-ohmic particles 140, and the elastomer (B) 124 which has relatively lower compatibility with the non-ohmic particles 140, are prepared.

Further, in this embodiment, a so-called varistor particle having a crystal part and a grain boundary part is prepared as the non-ohmic particle 140.

After the base elastomer 120 and the non-ohmic particles 140 are prepared, they are mixed (kneaded).

At this time, in this embodiment, the non-ohmic particles 140 are dispersed like a mesh in the base elastomer 120.

At this time, in this embodiment, the base elastomer and the non-ohmic particles are mixed so that, in a case of comparing volume resistivities $\rho$ of the non-ohmic composition within a range of $E \geq E_{th}$ for the non-ohmic composition not elongated, the volume resistivity $\rho$ for the non-ohmic composition uniaxially elongated by 50% is 50 times or less the volume resistivity $\rho$ for the non-ohmic composition not elongated.

At this time, in this embodiment, the base elastomer and the non-ohmic particles are mixed so that the threshold electric field strength $E_2$ at the starting point of decline $P_2$ for the non-ohmic composition uniaxially elongated by 50% is 1.4 times or less the threshold electric field strength $E_1$ at the starting point of decline $P_1$ for the non-ohmic composition not elongated, for example.

Specifically, at this time, an elastomer (A) 122, which has relatively higher compatibility with the non-ohmic particles 140, and an elastomer (B) 124, which has relatively lower compatibility with the non-ohmic particles 140, are mixed as the base elastomer 120 as described above, so that the elastomer (A) 122 rich in the non-ohmic particles 140 can form the sea phase while the elastomer (B) 124 can form the island phase. As a result, the non-ohmic particles 140 can be dispersed like a mesh in the base elastomer 120.

At this time, for example, the elastomer (A) 122, the elastomer (B) 124, and the non-ohmic particles 140 are mixed at the same time. As described above, even when these three materials are mixed at the same time, the difference in compatibility between the elastomer (A) 122 and the elastomer (B) 124 allows the elastomer (A) 122 to contain the non-ohmic particles 140 more than the elastomer (B) 124 does, and hence the non-ohmic particles 140 can be dispersed like a mesh in the base elastomer 120.

At this time, the elastomer (A) 122 and the non-ohmic particles 140 are compounded so as to occupy 30% or more of a total volume of the non-ohmic composition, for example. Accordingly, a state can be stably formed where the plurality of non-ohmic particles 140 is dispersed like a mesh in the base elastomer 120.

Other additives (a crosslinking agent, an antioxidant, a plasticizer, etc.) are added as necessary.

As described above, the non-ohmic composition of this embodiment can be obtained.

(S124: Step of Forming Non-Ohmic Resistive Layer)

After the non-ohmic composition is prepared, a mold having a predetermined core metal is used, the non-ohmic composition is injected into the mold, and crosslinked by heating at a predetermined temperature. Thereby, a non-ohmic resistive layer 220 is formed. As a result, the non-ohmic resistive layer 220 is formed having a cylindrical shape so as to form the hollow part 202.

(S126: Step of Forming Semi-Conductive Cone Part)

A mold having a predetermined conical void is employed, and a semi-conductive cone part 240 is formed by injecting a semi-conductive resin composition into the mold. At this time, in the semi-conductive cone part 240, an inclined surface 242 is formed which is inclined so that the semi-conductive cone part 240 is radially-expanded from one end side to the other end side in the axial direction of the hollow part 202.

(S128: Step of Forming Insulation Layer)

After the non-ohmic resistive layer 220 and the semi-conductive cone part 240 are formed, a mold having a core metal forming the hollow part 202 is used, and the non-ohmic resistive layer 220 is arranged to cover the outer periphery of the core metal. After the non-ohmic resistive layer 220 is arranged, the semi-conductive cone part 240 is arranged so that one end side of the semi-conductive cone part 240 is outside the non-ohmic resistive layer 220.

After the non-ohmic resistive layer 220 and the semi-conductive cone part 240 are arranged in the mold, the insulation resin composition is injected into the mold to form the insulation layer 260 to cover the non-ohmic resistive layer 220 and the semi-conductive cone part 240.

After the molding is completed, the molded body is taken out from the mold and unnecessary parts are removed from the molded body.

As described above, the cable connection unit 10 of this embodiment is produced. In this way, the cable connection unit 10 of this embodiment is prepared ready for site fabrication.

(S140: Step of Preparing Power Cable)

At a time of site fabrication, the power cable is peeled off stepwise in the axial direction from the tip, so that the cable conductor, the cable insulation layer, and the cable external semi-conductive layer are exposed in this order from the tip side of the power cable.

(S160: Step of Fitting)

After the cable connection unit 10 and the power cable are prepared, the power cable is fitted into the hollow part 202 of the cable connection unit 10. This embodiment may employ, for example, the following method for mounting with diameter-expansion.

First, a radially-expanded pipe is prepared which has an outer diameter larger than an outer diameter of the power cable. The radially-expanded pipe is, for example, divided with a dividing face along the axial direction. After the radially-expanded pipe is prepared, the radially-expanded pipe is inserted in the hollow part 202 of the cable connection unit 10 to radially expand the cable connection unit 10 in advance. After the cable connection unit 10 is radially-expanded, the power cable is inserted into the radially-expanded pipe, and the cable connection unit 10 is placed in a predetermined mounting position. After the cable connection unit 10 is placed, the radially-expanded pipe is removed from the hollow part 202 of the cable connection unit 10 to reduce the cable connection unit 10 in diameter. In this way, the power cable can be fitted in the hollow part 202 of the cable connection unit 10.

(S180: Step of Fitting in Insulator Bushing)

After the power cable is fitted in the hollow part 202 of the cable connection unit 10, the power cable is inserted in a predetermined insulator bushing while the cable connection unit 10 is externally fitted to the power cable. After the power cable is inserted in the insulator bushing, the tip of the cable conductor is fixed to an upper part of the insulator bushing and the extending side of the power cable is fixed to a lower part of the insulator bushing by a predetermined flange.

After the power cable is fixed to the insulator bushing, the insulator bushing is filled with a predetermined insulating medium.

As described above, the cable connection structure of this embodiment is produced.

(4) Effect According to this Embodiment

According to this embodiment, one or more effects described below are achieved.

(a) In the non-ohmic composition of this embodiment, the non-ohmic particles 140 are dispersed like a mesh in the base elastomer 120. Since the non-ohmic particles 140 are dispersed like a mesh as described above, the elasticity inherent in the base elastomer 120 can be maintained in the particle-free region existing outside the particle group region having a mesh-like shape. As a result, when the non-ohmic composition is elongated, the base elastomer 120 in the particle-free region can be preferentially deformed. On the other hand, in the particle group region, stress can be relaxed and the generation of gaps can be suppressed, at the interface between the base elastomer 120 and the non-ohmic particles 140. Thereby, the adjacent non-ohmic particles 140 are suppressed from separating from each other and the distance between the non-ohmic particles 140 can be suppressed from increasing. Since the distance between the non-ohmic particles 140 is suppressed from increasing, a low-resistance path can be stably formed among the non-ohmic particles at a time of applying a high electric field to the non-ohmic composition. As a result, the E-$\rho$ characteristic inherent in the non-ohmic composition can be stably maintained even when the non-ohmic composition is elongated.

(b) The E-$\rho$ characteristic of the non-ohmic composition is stably maintained even when the non-ohmic composition is elongated. Thereby, in the case where the cable connection unit 10 in a radially-expanded state is externally fitted to the power cable, the electric field can be evenly distributed in the non-ohmic resistive layer formed by the non-ohmic composition at a time of locally applying a high electric field. As a result, the occurrence of dielectric breakdown in the cable connection unit 10 can be suppressed.

(c) Since the E-$\rho$ characteristic of the non-ohmic composition is stably maintained even when the non-ohmic composition is elongated, a method for mounting with diameter-expansion can be employed wherein the cable connection unit 10 whose diameter is previously expanded is mounted in the power cable. Even when the method for mounting with diameter-expansion is adopted, the electric field relaxation effect of the non-ohmic resistive layer can be stably obtained without causing an irreversible change in the E-$\rho$ characteristic of the non-ohmic composition.

(d) Since the E-$\rho$ characteristic of the non-ohmic composition is stably maintained even when the non-ohmic composition is elongated, it is not necessary to compound the non-ohmic particles at an excessively high concentration. Thereby, the entanglement of the molecules in the base elastomer can be sufficiently ensured. As a result, the degradation of the elongation characteristic and of the residual elongation characteristic of the non-ohmic composition can be suppressed.

(e) In the non-ohmic composition of this embodiment, the coefficient of variation in the distance between the centers of gravity of the non-ohmic particles 140 is 0.5 or more. Since the coefficient of variation is 0.5 or more, a state can be stably formed where the plurality of non-ohmic particles 140 is dispersed like a mesh in the base elastomer 120. Thereby, stress can be easily relaxed, and the generation of gaps can be stably suppressed, at the interface between the base elastomer 120 and the non-ohmic particles 140. As a result, the variation in the E-ρ characteristic of the non-ohmic composition can be stably suppressed regardless of the elongation state of the non-ohmic composition.

(f) In the non-ohmic composition of this embodiment, the base elastomer 120 includes an elastomer (A) 122 which has relatively higher compatibility with the non-ohmic particles 140, and an elastomer (B) 124 which has relatively lower compatibility with the non-ohmic particles 140. Thereby, the elastomer (A) can 122 contain more non-ohmic particles 140 than the elastomer (B) 124 does, so that the elastomer (A) 122 can form the sea phase.

On the other hand, the elastomer (B) 124 can form an island phase. As a result, a state can be stably formed where the non-ohmic particles 140 are dispersed like a mesh in the base elastomer 120.

(5) Modified Example of this Embodiment

The first embodiment described above can be modified as in the following modified example, if necessary. Hereinafter, only the elements different from the elements in the above-described embodiments will be described, and the elements substantially the same as the elements described in the above-described embodiments are designated by the same reference numerals and the description thereof will be omitted.

In the modified examples 1 and 2, the configuration of the base elastomer is different from the configuration in the first embodiment described above.

(5-1) Modified Example 1

In the non-ohmic composition of the modified example 1 before crosslinking, for example, the elastomer (A) 122 is non-crosslinked, while the elastomer (B) 124 contains (consists of) a rubber which has been previously crosslinked. It is difficult to disperse the non-ohmic particles 140 in the crosslinked rubber. Accordingly, the non-ohmic particles 140 can be dispersed preferentially in the elastomer (A) 122.

At least a part of the elastomer (A) may be crosslinked. However, even in this case, for example, it is preferable that the crosslinking density of the elastomer (B) 124 is higher than the crosslinking density of the elastomer (A) 122.

In the modified example 1, the elastomer (A) 122 and the elastomer (B) 124 may include different materials, or the elastomer (A) 122 and the elastomer (B) 124 may include materials which are the same except for their crosslinked state.

Specifically, the elastomer (A) 122 is, for example, silicone rubber (Q), ethylene propylene rubber (EPR), ethylene propylene diene rubber (EPDM), styrene butadiene rubber (SBR), epichlorohydrin rubber (CO), chloroprene rubber (CR), chlorosulfonated polyethylene rubber (CSM), nitrile rubber (NBR), acrylic rubber (ACM), ethylene acrylic rubber (AEM), ethylene vinyl acetate copolymer (EVM), ure-thane rubber (U). The elastomer (B) 124 is, for example, particles created by freezing and pulverizing crosslinked substance such as ethylene propylene rubber (EPR), ethylene propylene diene rubber (EPDM), styrene butadiene rubber (SBR), epichlorohydrin rubber (CO), chloroprene rubber (CR), chlorosulfonated polyethylene rubber (CSM), nitrile rubber (NBR), acrylic rubber (ACM), ethylene acrylic rubber (AEM), ethylene vinyl acetate copolymer (EVM), urethane rubber (U) or the like, or elastomer which has been previously crosslinked as powder such as silicone rubber powder (KMP-597. KMP-598, KMP-594, X-52875 manufactured by Shin-Etsu Chemical Co., Ltd.).

In the non-ohmic resistive layer 220 of the cable connection unit 10 of the modified example 1, for example, the elastomer (A) 122 and the elastomer (B) 124 are chemically bonded to each other via crosslinking. In the non-ohmic resistive layer 220, the elastomer (A) 122 and the elastomer (B) 124 may be uniformly crosslinked, or the crosslinking density of the elastomer (B) 124 may be higher than the crosslinking density of the elastomer (A) 122.

In the step of preparing non-ohmic composition S122 of the modified example 1, for example, the elastomer (A) 122, the elastomer (B) 124, and the non-ohmic particles 140 are mixed at the same time as in the first embodiment described above. During mixing, the elastomer (B) 124 is maintained in a crosslinked state. Accordingly, the non-ohmic particles 140 can be suppressed from being dispersed in the elastomer (B) 124.

(Effect)

According to the modified example 1, since the elastomer (B) 124 contains a rubber which has been previously crosslinked, the non-ohmic particles 140 can be suppressed from being dispersed in the elastomer (B) 124 during mixing. Accordingly, the non-ohmic particles 140 can be dispersed preferentially in the elastomer (A) 122, and the elastomer (A) 122 rich in the non-ohmic particles 140 can form the sea phase. As a result, a state can be stably formed where the non-ohmic particles 140 are dispersed like a mesh in the base elastomer 120.

(5-2) Modified Example 2

In the non-ohmic composition of the modified example 2 before crosslinking, for example, the elastomer (A) 122 contains (consists of) a rubber, while the elastomer (B) 124 contains (consists of) a thermoplastic elastomer.

In the modified example 2, a melting point of the elastomer (B) 124 is, for example, higher than a softening point of the elastomer (A) 122. Furthermore, the melting point of the elastomer (B) 124 is preferably higher than a temperature of the non-ohmic composition during mixing, for example.

Specifically, the elastomer (A) 122 is, for example, silicone rubber (Q), ethylene propylene rubber (EPR), ethylene propylene diene rubber (EPDM), styrene butadiene rubber (SBR), epichlorohydrin rubber (CO), chloroprene rubber (CR), chlorosulfonated polyethylene rubber (CSM), nitrile rubber (NBR), acrylic rubber (ACM), ethylene acrylic rubber (AEM), ethylene vinyl acetate copolymer (EVM). The elastomer (B) 124 is, for example, an olefinic thermoplastic elastomer, a polyamide-based thermoplastic elastomer, or a polyurethane-based thermoplastic elastomer, having a particle-like shape.

In the non-ohmic resistive layer 220 of the cable connection unit 10 of the modified example 2, for example, the elastomer (A) 122 and the elastomer (B) 124 are chemically bonded to each other via crosslinking.

In the step of preparing non-ohmic composition S122 of the modified example 2, for example, the elastomer (A) 122, the elastomer (B) 124, and the non-ohmic particles 140 are mixed at the same time as in the first embodiment described above. During mixing, the elastomer (B) 124 is maintained in an unmelted state. Accordingly, the non-ohmic particles 140 can be suppressed from being dispersed in the elastomer (B) 124.

(Effect)

According to the modified example 2, since a melting point of the elastomer (B) 124 is higher than a softening point of the elastomer (A) 122, the elastomer (B) 124 is maintained in an unmelted state during mixing, and the non-ohmic particles 140 can be suppressed from being dispersed in the elastomer (B) 124. Thereby, the non-ohmic particles 140 can be dispersed preferentially in the elastomer (A), and the elastomer (A) 122 rich in the non-ohmic particles 140 can form the sea phase. As a result, a state can be stably formed where the non-ohmic particles 140 are dispersed like a mesh in the base elastomer 120.

Second Embodiment of the Disclosure

Figure 5:
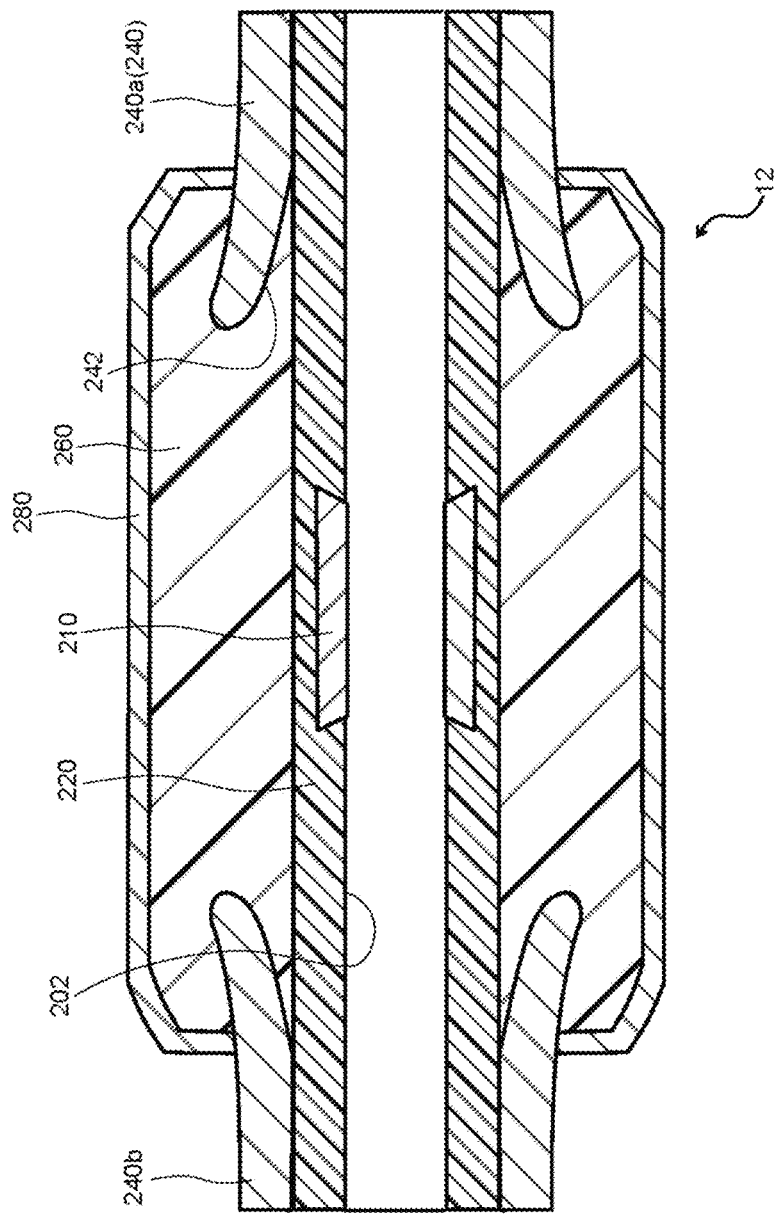
FIG. 5 is a cross-sectional diagram of a cable connection unit according to a second embodiment of the present disclosure.

Next, with reference to FIG. 5, the second embodiment of the present disclosure will be described. FIG. 5 is a cross-sectional diagram illustrating a cable connection unit according to this embodiment.

In this embodiment, the cable connection mode in the cable connection unit is different from that in the first embodiment. Hereinafter, as in the modified example of the first embodiment, only the elements different from those of the first embodiment will be described.

(1) Cable Connection Unit

The cable connection unit (cable intermediate connection unit) 12 of this embodiment is configured to be used, for example, in a cable intermediate connection structure in which a pair of power cables are butted against each other while aligning their axes and connected in a straight line. Of the pair of the power cables, hereinafter, one is referred to as a "first power cable" and the other is referred to as a "second power cable".

In this embodiment, one end in the axial direction of the cable connection unit 12 that is on the extending side of the first power cable of the cable connection unit 12 is referred to as a "first end of the cable connection unit 12". On the other hand, the other end in the axial direction of the cable connection unit 12 that is on the extending side of the second power cable of the cable connection unit 12 is referred to as a "second end of the cable connection unit".

As illustrated in FIG. 5, the cable connection unit 12 includes, for example, an internal semi-conductive layer 210, a non-ohmic resistive layer 220, a semi-conductive cone part 240, an insulation layer 260, and an external semi-conductive layer 280.

The internal semi-conductive layer 210 has, for example, semi-conductivity. Specifically, the internal semi-conductive layer 210 contains, for example, the same semi-conductive rubber as that for the semi-conductive cone part 240. The internal semi-conductive layer 210 is provided having a cylindrical shape, for example, to form a central portion in the axial direction of the hollow part 202. The internal semi-conductive layer 210 is arranged to cover a compression sleeve that compressively connects the cable conductors to each other when a pair of the power cables is fitted in the hollow part 202. Therefore, the internal semi-conductive layer 210 is almost at the same potential as that of the cable conductor, that is, at a high potential.

The non-ohmic resistive layer 220 is provided having a cylindrical shape, for example, to form another part in the axial direction of the hollow part 202 other than the internal semi-conductive layer 210. Further, the non-ohmic resistive layer 220 is provided to cover the internal semi-conductive layer 210. The non-ohmic resistive layer 220 extends to cover from the cable external semi-conductive layer of the first power cable to the cable external semi-conductive layer of the second power cable when a pair of power cables are fitted in the hollow part 202.

When a pair of the power cables is fitted in the hollow part 202, both ends of the non-ohmic resistive layer 220 contact the cable external semi-conductive layer of the first power cable and the cable external semi-conductive layer of the second power cable, respectively. Therefore, the ends are grounded. On the other hand, the portion of the non-ohmic resistive layer 220 in contact with the internal semi-conductive layer 210 is at a high potential as with the internal semi-conductive layer 210. In the non-ohmic resistive layer 220, the resistance at the electric field concentration point is reduced due to its non-ohmic characteristic, so that the equipotential lines can be evenly distributed from the internal semi-conductive layer 210 side toward each of both end sides.

For example, a pair of semi-conductive cone parts 240 is provided on both sides in the axial direction of the cable connection unit 12 across the internal semi-conductive layer 210. Of the pair of semi-conductive cone parts 240, the one on the first power cable side is referred to as a "first semi-conductive cone part 240a", while the other one on the second power cable side is referred to as a "second semi-conductive cone part 240b".

The first semi-conductive cone part 240a and the second semi-conductive cone part 240b are each configured having a conical shape, with the radially-expanded sides facing each other.

The first end side of the first semi-conductive cone part 240a in the axial direction of the cable connection unit 10 may be in contact with or separated from the non-ohmic resistive layer 220. The first semi-conductive cone part 240a has an inclined surface 242 that is inclined so as to be gradually separated from the non-ohmic resistive layer 220, from the portion close to the non-ohmic resistive layer 220 toward the second end side in the axial direction of the cable connection unit 10.

On the other hand, the second semi-conductive cone part 240b is, for example, configured symmetrically with the first semi-conductive cone part 240a across the internal semi-conductive layer 210.

The insulation layer 260 is provided to cover the non-ohmic resistive layer 220 and a pair of the semi-conductive cone parts 240. The insulation layer 260 is provided, for example, to be intercalated between the non-ohmic resistive layer 220 and the inclined surface 242 of the first semi-conductive cone part 240a, or between the non-ohmic resistive layer 220 and the inclined surface 242 of the second semi-conductive cone part 240b.

The external semi-conductive layer 280 is provided to cover the insulation layer 260. The external semi-conductive layer 280 is in contact with the first semi-conductive cone part 240a and the second semi-conductive cone part 240b. Therefore, the external semi-conductive layer 280 is grounded together with the first semi-conductive cone part 240a and the second semi-conductive cone part 240b.

The internal semi-conductive layer 210, the non-ohmic resistive layer 220, a pair of the semi-conductive cone parts 240, the insulation layer 260, and the external semi-conductive layer 280 described above are, for example, molded to be integrally bonded.

(2) Effect

Even with the cable connection unit 12 used for the cable intermediate connection structure as in this embodiment, the same effect as that of the above-described first embodiment can be obtained.

Other Embodiments of the Disclosure

Although embodiments of the present disclosure have been specifically described, the present disclosure is not limited to the above-described embodiments, and various modifications can be made without departing from the scope of the present disclosure. The "above-described embodiments" used herein means the first embodiment and the second embodiment.

In the above-described embodiments, the case where the cable connection unit 10 has the semi-conductive cone part 240 has been described, but the present disclosure is not limited thereto. For example, instead of providing the semi-conductive cone part 240, the insulation layer 260 may be gradually reduced in diameter from the center toward both ends in the axial direction. Thereby, an electric field concentration on both end sides in the axial direction of the insulation layer 260 can be relaxed.

In the second embodiment described above, the semi-conductive cone part 240 and the external semi-conductive layer 280 are depicted as separate bodies, but the semi-conductive cone part 240, as a part of the external semi-conductive layer 280, may be integrated with the external semi-conductive layer 280.

In the above-described embodiments, the step of preparing non-ohmic composition S122 has been explained for a case where the elastomer (A) 122, the elastomer (B) 124, and the non-ohmic particles 140 are mixed at the same time, but the present disclosure is not limited thereto. For example, a master batch in which the elastomer (A) 122 and the non-ohmic particles 140 are mixed may be prepared in advance, and then the master batch and the elastomer (B) 124 may be mixed.

In the above-described embodiments, a case where the method for mounting with diameter-expansion using the radially-expanded pipe is adopted in the step of fitting S160 has been described, but the present disclosure is not limited thereto. For example, the cable connection unit 10 may be radially-expanded by the inner core formed by spirally winding the inner core ribbon. In this case, in order to reduce the diameter of the cable connection unit 10, the inner core ribbon may be gradually unwound from one end side in the axial direction of the cable connection unit 10.

In the above-described embodiments, a case where the non-ohmic resistive layer 220, the semi-conductive cone part 240, and the insulation layer 260 are integrally cross-linked has been described, but the present disclosure is not limited thereto. For example, the semi-conductive cone part 240 and the insulation layer 260 may be integrally cross-linked, and the non-ohmic resistive layer 220 may be produced using a separate mold.

In the above-described embodiments, an example of the production method has been described, but the order of each step in the production method may be changed whenever possible.

Although it has been explained that the configuration of the modified example 1 or 2 is applicable to the first embodiment described above, the configuration of the modified example 1 or 2 of the first embodiment may be applied to the second embodiment as well.

Example

Next, Example according to the present disclosure will be described. Example is illustrative of the present disclosure, and the present disclosure is not limited by the Example.

(1) Preparation of Non-Ohmic Composition

The non-ohmic compositions of Example were prepared as follows. Specifically, the base elastomer and the non-ohmic particles illustrated below were prepared first. Next, the base elastomer, the non-ohmic particles, and other additives were kneaded to prepare the non-ohmic composition. At this time, the elastomer (A) and the non-ohmic particles were compounded so as to occupy 30% or more of the total volume of the non-ohmic composition. Next, the obtained non-ohmic composition was pressure-molded at a temperature of 160° C. for 1 hour to prepare a sample sheet simulating the non-ohmic resistive layer used for the cable connection unit.

Example

Base Elastomer:
Base elastomer (A): Ethylene acrylic rubber
Base elastomer (B): Ethylene propylene diene rubber
Non-ohmic particles: Particles containing zinc oxide and a trace amount of metal oxide such as bismuth and antimony oxide (the maximum particle size: 7 μm, the mean volume diameter: 3 μm) (0.3 by volume with respect to the base elastomer)
Other additives (a content based on 100 parts by mass of the base elastomer is noted in brackets):
Crosslinking agent: DCP (1.5 parts by mass)
Crosslinking aid: Zinc oxide No. 3 (5 parts by mass)
Plasticizer: Polybutadiene oil (10 parts by mass)
Antioxidant; Amine-based TMDQ (1.5 parts by mass)

On the other hand, in Comparative Example, the non-ohmic compositions were prepared and sample sheets were prepared in the same manner as in Example except that only the ethylene propylene diene rubber was used as the base elastomer.

(2) Evaluation (Cross-Section Observation)

Cross-sections of the non-ohmic compositions of Example and Comparative Example were observed with a scanning electron microscope (SEM).

(Distance Between Centers of Gravity of Non-Ohmic Particles)

The distance between the centers of gravity of the non-ohmic particles in the sample sheet of each of Example and Comparative Example was measured as follows. Specifically, the distance between the centers of gravity was measured by an image analysis method. More specifically, the distance between the centers of gravity of a plurality of adjacent non-ohmic particles was measured in a cross-sectional SEM observation image at 2,000× magnification. The term "adjacent particles" used herein means, as described above, particles of interest with no other particles existing on the straight line connecting their centers of gravity.

(Volume Resistivity)

The volume resistivity of sample sheet of each of Example and Comparative Example was measured as follows. Specifically, the sample sheet was sandwiched between circular parallel plate electrodes of a diameter of 25 mm having a guard electrode, and the sample sheet was immersed in silicone oil at a temperature of 30° C.

Next, a predetermined voltage was applied stepwise between the electrodes with the sample sheet sandwiched therebetween, and the current flowing between the electrodes was measured with a microammeter. The obtained current value was substituted into the following formula (2), and the volume resistivity ρ with respect to a predetermined voltage (electric field) was calculated.

$$\rho = S*V/t*I \quad (2)$$

wherein ρ: volume resistivity, S: electrode area, t: sample sheet thickness, V: applied voltage, and I: measured current.

Using the measurement method described above, the volume resistivity ρ was measured for the sample sheet not elongated, for the sample sheet elongated by 30% in a predetermined uniaxial direction along the main surface using a predetermined tension jig, and for the sample sheet elongated by 50% in the same manner as described above.

(Tensile Characteristic)

At room temperature, a JIS-3 dumbbell piece with a thickness of 2 mm was elongated at a speed of 200 mm/min using a tensile tester, and the elongation percentage and stress at break were evaluated.

(Residual Elongation Characteristic)

At room temperature, a strip test piece with a thickness of 2 mm, a width of 5 mm, and a length of 120 mm was elongated for 24 hours at an elongation percentage of 130% using a predetermined elongation jig, and then the test piece was removed from the elongation jig at room temperature, and the residual elongation percentage was evaluated after a lapse of 24 hours.

(3) Results (Cross-Section Observation)

Figure 6A:
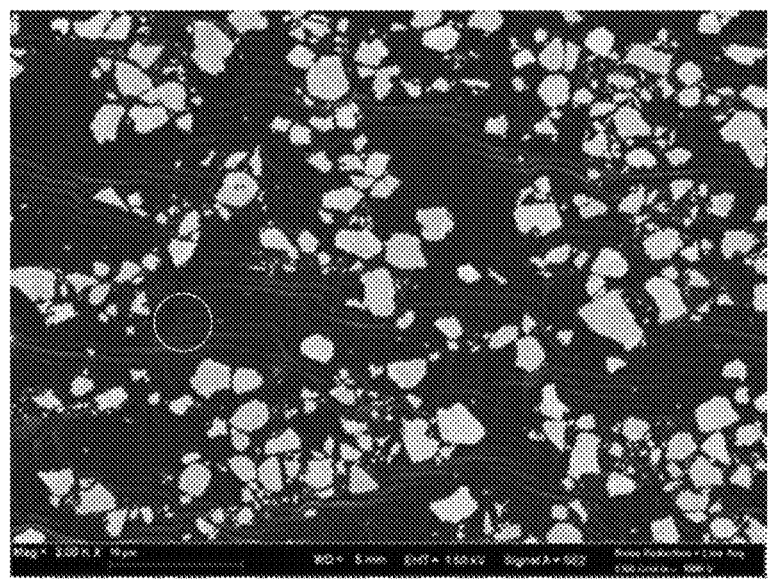
FIG. 6A is a diagram illustrating an observation image of a non-ohmic composition according to Example observed with a scanning electron microscope.
Figure 6B:
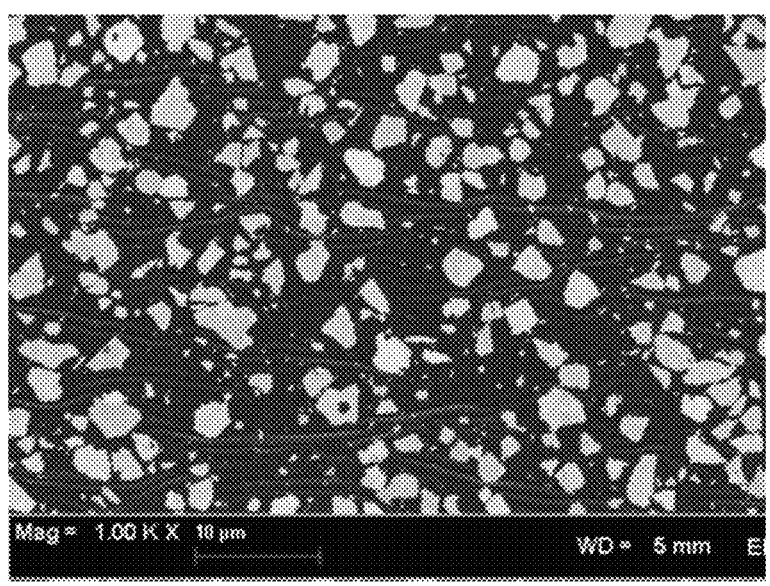
FIG. 6B is a diagram illustrating an observation image of a non-ohmic composition according to Comparative Example observed with a scanning electron microscope.

The results of cross-section observation of each of Example and Comparative Example will be described with reference to FIG. 6A and FIG. 6B. FIG. 6A is a diagram illustrating an observation image of the non-ohmic composition according to Example observed with a scanning electron microscope. FIG. 6B is a diagram illustrating an observation image of the non-ohmic composition according to Comparative Example observed with a scanning electron microscope.

In Comparative Example, as illustrated in FIG. 6B, the non-ohmic particles were evenly dispersed in the base elastomer. In Comparative Example, the particle-free region was small, having a diameter of less than 4.5 μm in a cross-sectional view.

In contrast, in Example, it was confirmed that the non-ohmic particles were dispersed like a mesh in the base elastomer, as illustrated in FIG. 6A. In Example, it was also confirmed that there was a plurality of particle-free regions having a diameter of at least 4.5 μm (dotted line in the figure) or more in a cross-sectional view.

(Distance Between Centers of Gravity of Non-Ohmic Particles)

Figure 7:
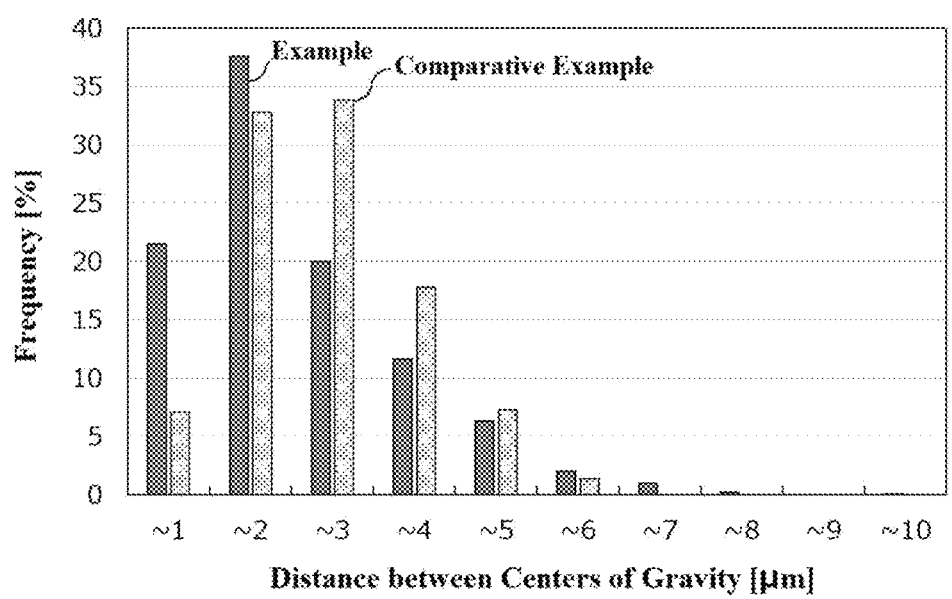
FIG. 7 is a diagram illustrating a frequency with respect to a distance between the centers of gravity of non-ohmic particles in the non-ohmic composition of each of Example and Comparative Example.

The results of measuring the distance between the centers of gravity of the non-ohmic particles in each of Example and Comparative Example will be described with reference to FIG. 7. FIG. 7 is a diagram illustrating a frequency with respect to a distance between the centers of gravity of the non-ohmic particles in the non-ohmic composition of each of Example and Comparative Example.

In Comparative Example, as illustrated in FIG. 7, since the non-ohmic particles were evenly dispersed in the base elastomer as described above, a range of the distances between centers of gravity was small. Specifically, the mean value of the distance between the centers of gravity of the non-ohmic particles was 2.59 μm, and the standard deviation of the distance between the centers of gravity was 1.06 μm. As a result, the coefficient of variation calculated by formula (1) described above was 0.41.

In contrast, in Example, since the non-ohmic particles were dispersed like a mesh in the base elastomer as described above, the distances between the centers of gravity were distributed over a wide range. Specifically, the mean value of the distance between the centers of gravity of the non-ohmic particles was 2.41 μm, and the standard deviation of the distance between the centers of gravity was 1.43 μm. As a result, it was confirmed that the coefficient of variation obtained by the above formula (1) was 0.59.

(Volume Resistivity)

Figure 8:
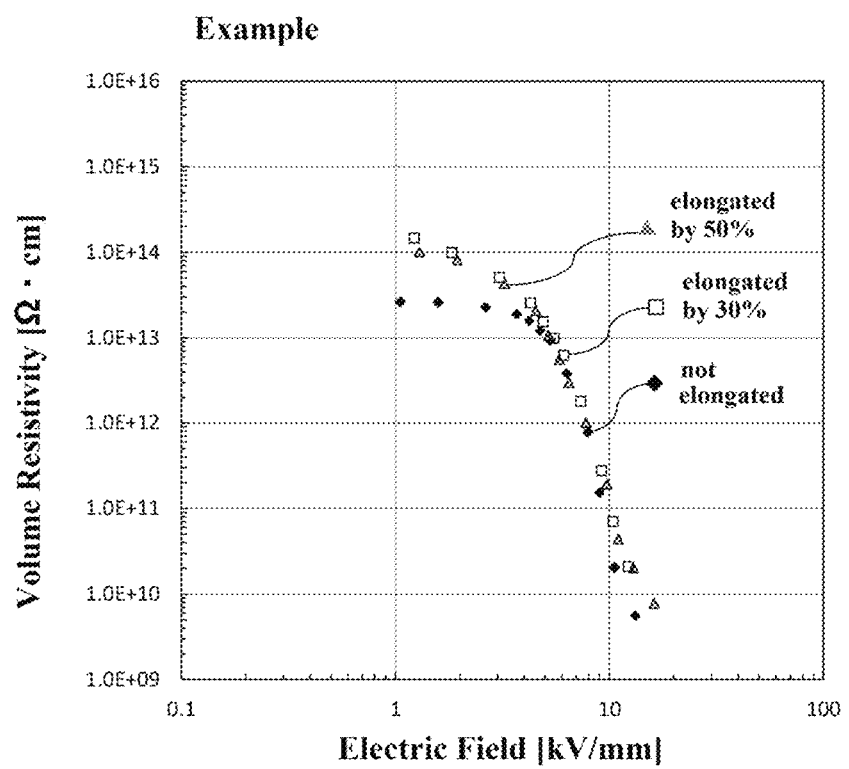
FIG. 8 is a diagram illustrating a volume resistivity with respect to an electric field strength in the non-ohmic composition of Example.
Figure 9:
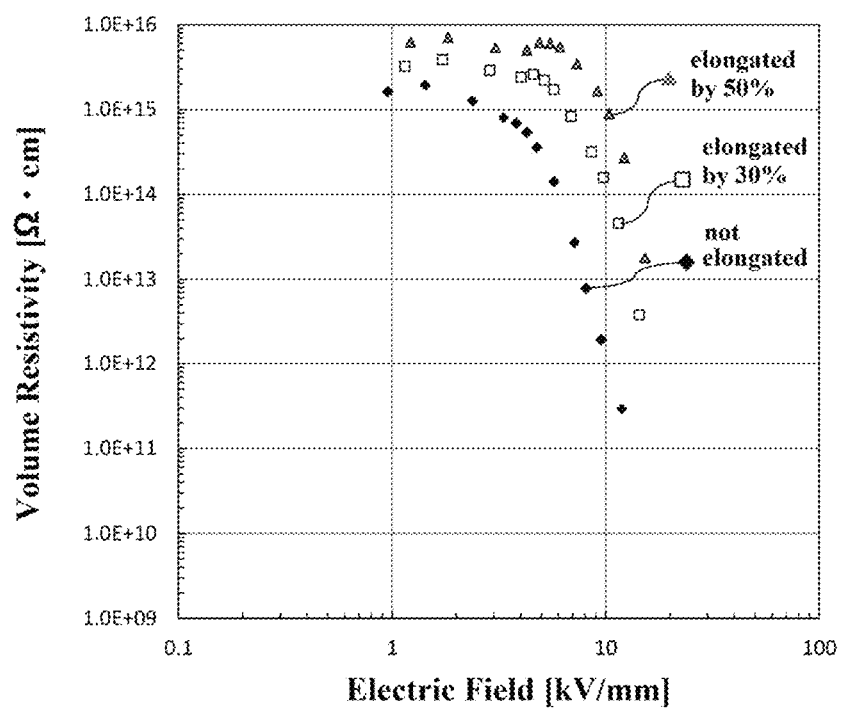
FIG. 9 is a diagram illustrating a volume resistivity with respect to an electric field strength in the non-ohmic composition of Comparative Example.

The results of measuring the volume resistivity of the non-ohmic composition in each of Example and Comparative Example will be described with reference to FIG. 8 and FIG. 9. FIG. 8 is a diagram illustrating a volume resistivity with respect to an electric field strength in a non-ohmic composition of Example. FIG. 9 is a diagram illustrating a volume resistivity with respect to an electric field strength in a non-ohmic composition of Comparative Example.

In Comparative Example, as illustrated in FIG. 9, the volume resistivity ρ gradually increased as the non-ohmic composition was gradually and progressively elongated. Specifically, in Comparative Example, in a case of comparing volume resistivities ρ of the non-ohmic composition within a range of E≥E$_1$ for the non-ohmic composition not elongated, the volume resistivity ρ for the non-ohmic composition uniaxially elongated by 50% was more than 50 times the volume resistivity ρ for the non-ohmic composition not elongated.

Moreover, in Comparative Example, the starting point of decline of the volume resistivity ρ was shifted toward the high electric field strength side as the non-ohmic composition was gradually and progressively elongated. Specifically, in Comparative Example, the threshold electric field strength $E_{th}$ at the starting point of decline for the non-ohmic composition uniaxially elongated by 50% was more than 1.4 times the threshold electric field strength $E_{th}$ at the starting point of decline for the non-ohmic composition not elongated.

The results of Comparative Example show that the non-ohmic particles were evenly dispersed in the base elastomer, so that stress increased to generate a gap, at the interface between the non-ohmic particles and the base elastomer when the non-ohmic composition was elongated. Adjacent non-ohmic particles were separated from each other, and the distance between the non-ohmic particles was increased. As a result, it is considered that the E-ρ characteristic varied due to the elongation of the non-ohmic composition.

In contrast, in Example, the change in the volume resistivity ρ was small even when the non-ohmic composition was gradually and progressively elongated, as illustrated in FIG. 8. Specifically, in Example, in a case of comparing volume resistivities ρ of the non-ohmic composition within a range of E≥E$_1$ for the non-ohmic composition not elongated, it was confirmed that the volume resistivity ρ for the non-ohmic composition uniaxially elongated by 50% was 20 times or less the volume resistivity ρ for the non-ohmic composition not elongated.

In Example, even when the non-ohmic composition was gradually and progressively elongated, the starting point of decline of the volume resistivity ρ was almost the same. Specifically, in Comparative Example, it was confirmed that the threshold electric field strength $E_{th}$ at the starting point of decline for the non-ohmic composition uniaxially elongated by 50% was 1.2 times or less the threshold electric field strength $E_{th}$ at the starting point of decline for the non-ohmic composition not elongated.

In Example, even when the non-ohmic composition was gradually and progressively elongated, the variation in the slope of the linear portion in the range of $E > E_{th}$ was small. Specifically, the slope of the linear portion in the range of $E > E_{th}$ for the non-ohmic composition uniaxially elongated by 50% was decreased by 25% with respect to the slope of the linear portion in the range of $E > E_{th}$ for the non-ohmic composition not elongated, falling within ±50%.

(Tensile Characteristic)

In Example, the results of measurement were as follows: the elongation at break: 280%, and the strength at break: 5.9 MPa. On the other hand, in Comparative Example, the results of measurement were as follows: the elongation at break: 280%, and the strength at break: 6.0 MPa. In other words, the tensile characteristic in Example was almost the same as the tensile characteristic in Comparative Example.

(Residual Elongation Characteristic)

As a result of the measurement, the residual elongation percentage of Example was 9.2%. On the other hand, the residual elongation percentage of Comparative Example was 8.7%. In other words, the residual elongation characteristic of Example was almost the same as the residual elongation characteristic of Comparative Example.

(Summary)

According to the above-described results of Example, since the non-ohmic particles are dispersed like a mesh in the base elastomer, the base elastomer in the particle-free region can be preferentially deformed when the non-ohmic composition is elongated. On the other hand, in the particle group region, stress can be relaxed and the generation of gaps can be suppressed, at the interface between the base elastomer and the non-ohmic particles. Thereby, the distance between the non-ohmic particles can be suppressed from increasing. As a result, it is confirmed that the E-ρ characteristic inherent in the non-ohmic composition can be stably maintained even when the non-ohmic composition is elongated.

According to the results of Example, since the non-ohmic particles are not compounded at excessively high concentration, the entanglement of the molecules in the base elastomer can be sufficiently ensured. As a result, it is confirmed that the degradation of the elongation characteristic and of the residual elongation characteristic of the non-ohmic composition can be suppressed.

Preferred Aspect of the Present Disclosure

Hereinafter, supplementary descriptions of the preferred aspects of the present disclosure will be given.

(Supplementary Description 1)

A non-ohmic composition including a base elastomer and a plurality of non-ohmic particles,
wherein, in a case of comparing volume resistivities ρ of the non-ohmic composition within a range of $E \geq E_{th}$ for the non-ohmic composition not elongated,
the E being an electric field strength applied to the non-ohmic composition,
the ρ being the volume resistivity of the non-ohmic composition, and
the $E_{th}$ being a threshold electric field strength at a point where an absolute value of a variation in a slope of log ρ with respect to log E is maximum,
the volume resistivity ρ for the non-ohmic composition uniaxially elongated by 50% is 50 times or less the volume resistivity ρ for the non-ohmic composition not elongated.

(Supplementary Description 2)

The non-ohmic composition according to supplementary description 1.
wherein the threshold electric field strength $E_{th}$ for the non-ohmic composition uniaxially elongated by 50% is 1.4 times or less the $E_{th}$ for the non-ohmic composition not elongated.

(Supplementary Description 3)

A non-ohmic composition including a base elastomer and a plurality of non-ohmic particles,
wherein $E_{th}$ for the non-ohmic composition uniaxially elongated by 50% is 1.4 times or less $E_{th}$ for the non-ohmic composition not elongated,
the $E_{th}$ being a threshold electric field strength at a point where an absolute value of a variation in a slope of log ρ with respect to log E is maximum,
the E being an electric field strength applied to the non-ohmic composition, and
the ρ being a volume resistivity of the non-ohmic composition.

(Supplementary Description 4)

The non-ohmic composition according to any one of supplementary descriptions 1 to 3,
wherein the slope of a linear portion in a range of $E > E_{th}$ for the non-ohmic composition uniaxially elongated by 50% is within ±50% with respect to the slope of a linear portion in a range of $E > E_{th}$ for the non-ohmic composition not elongated.

(Supplementary Description 5)

The non-ohmic composition according to any one of supplementary descriptions 1 to 4,
wherein the plurality of non-ohmic particles is dispersed like a mesh in the base elastomer.

(Supplementary Description 6)

A non-ohmic composition including a base elastomer and a plurality of non-ohmic particles,
wherein the plurality of non-ohmic particles is dispersed like a mesh in the base elastomer.

(Supplementary Description 7)

The non-ohmic composition according to any one of supplementary descriptions 1 to 6,
wherein a coefficient of variation in a distance between the centers of gravity of the plurality of non-ohmic particles is 0.5 or more as determined by the following formula:

$$\text{Coefficient of variation} = \text{standard deviation/average value} \quad (1).$$

(Supplementary Description 8)

The non-ohmic composition according to any one of supplementary descriptions 1 to 7,
wherein there exists a plurality of particle-free regions with no non-ohmic particles, having a diameter equivalent to 1.5 times or more the mean volume diameter of the non-ohmic particles, when viewing a cross section of the non-ohmic composition.

(Supplementary Description 9)

The non-ohmic composition according to any one of supplementary descriptions 1 to 8,
wherein the base elastomer includes:
an elastomer (A) having relatively higher compatibility with the non-ohmic particles, and an elastomer (B) having relatively lower compatibility with the non-ohmic particles,
the elastomer (A) includes the non-ohmic particles more than the elastomer (B) does, and forms a sea phase, and the elastomer (B) forms an island phase.

(Supplementary Description 10)
The non-ohmic composition according to supplementary description 9,
wherein the difference between a solubility parameter of the elastomer (A) and a solubility parameter of the elastomer (B) is 0.5 $(\text{cal/cm}^3)^{1/2}$ or more.

(Supplementary Description 11)
The non-ohmic composition according to supplementary description 9,
wherein the elastomer (A) is non-crosslinked, and
the elastomer (B) contains a crosslinked rubber.

(Supplementary Description 12)
The non-ohmic composition according to supplementary description 9,
wherein a crosslinking density of the elastomer (B) is higher than a crosslinking density of the elastomer (A).

(Supplementary Description 13)
The non-ohmic composition according to supplementary description 9,
wherein the elastomer (A) contains a rubber.
the elastomer (B) contains a thermoplastic elastomer, and
a melting point of the elastomer (B) is higher than a softening point of the elastomer (A).

(Supplementary Description 14)
The non-ohmic composition according to any one of supplementary descriptions 9 to 13,
wherein the elastomer (A) and the non-ohmic particles occupy 30% or more of a total volume of the non-ohmic composition.

(Supplementary Description 15)
The non-ohmic composition according to any one of supplementary descriptions 9 to 14,
wherein the elastomer (A) and the elastomer (B) are chemically bonded to each other.

(Supplementary Description 16)
The non-ohmic composition according to any one of supplementary descriptions 9 to 15,
wherein the elastomer (A) and the elastomer (B) each have insulation.

(Supplementary Description 17)
The non-ohmic composition according to any one of supplementary descriptions 9 to 16,
wherein an elastic modulus of the elastomer (B) is lower than an elastic modulus of the elastomer (A).

(Supplementary Description 18)
A cable connection unit having a cylindrical shape, in which a power cable is fitted, including:
a non-ohmic resistive layer having a cylindrical shape and including a non-ohmic composition, and
an insulation layer provided to cover an outside of the non-ohmic resistive layer;
the non-ohmic composition including a base elastomer and a plurality of non-ohmic particles,
wherein, in a case of comparing volume resistivities $\rho$ of the non-ohmic composition within a range of $E \geq E_{th}$ for the non-ohmic composition not elongated,
the E being an electric field strength applied to the non-ohmic composition,
the $\rho$ being the volume resistivity of the non-ohmic composition, and
the $E_{th}$ being a threshold electric field strength at a point where an absolute value of a variation in a slope of log $\rho$ with respect to log E is maximum,
the volume resistivity $\rho$ for the non-ohmic composition uniaxially elongated by 50% is 50 times or less the volume resistivity $\rho$ for the non-ohmic composition not elongated.

(Supplementary Description 19)
A cable connection unit having a cylindrical shape, in which a power cable is fitted, including:
a non-ohmic resistive layer having a cylindrical shape and including a non-ohmic composition, and
an insulation layer provided to cover an outside of the non-ohmic resistive layer;
the non-ohmic composition including a base elastomer and a plurality of non-ohmic particles,
wherein $E_{th}$ for the non-ohmic composition uniaxially elongated by 50% is 1.4 times or less $E_{th}$ for the non-ohmic composition not elongated,
the $E_{th}$ being a threshold electric field strength at a point where an absolute value of a variation in a slope of log $\rho$ with respect to log E is maximum,
the E being an electric field strength applied to the non-ohmic composition, and
the $\rho$ being a volume resistivity of the non-ohmic composition.

(Supplementary Description 20)
A cable connection unit having a cylindrical shape, in which a power cable is fitted, including:
a non-ohmic resistive layer having a cylindrical shape and including a non-ohmic composition, and
an insulation layer provided to cover an outside of the non-ohmic resistive layer;
the non-ohmic composition including a base elastomer and a plurality of non-ohmic particles,
wherein the plurality of non-ohmic particles is dispersed like a mesh in the base elastomer.

(Supplementary Description 21)
A method for producing a cable connection unit having a cylindrical shape, in which a power cable is fitted, including:
preparing a non-ohmic composition including a base elastomer and a plurality of non-ohmic particles,
forming a non-ohmic resistive layer having a cylindrical shape with the non-ohmic composition, and
forming an insulation layer to cover an outside of the non-ohmic resistive layer,
wherein, in the preparation of the non-ohmic composition, the base elastomer and the plurality of non-ohmic particles are mixed so that, in a case of comparing volume resistivities $\rho$ of the non-ohmic composition within a range of $E \geq E_{th}$ for the non-ohmic composition not elongated,
the E being an electric field strength applied to the non-ohmic composition,
the $\rho$ being the volume resistivity of the non-ohmic composition, and
the $E_{th}$ being a threshold electric field strength at a point where an absolute value of a variation in a slope of log $\rho$ with respect to log E is maximum,
the volume resistivity $\rho$ for the non-ohmic composition uniaxially elongated by 50% is 50 times or less the volume resistivity $\rho$ for the non-ohmic composition not elongated.

(Supplementary Description 22)
A method for producing a cable connection unit having a cylindrical shape, in which a power cable is fitted, including:

preparing a non-ohmic composition including a base elastomer and a plurality of non-ohmic particles, forming a non-ohmic resistive layer having a cylindrical shape with the non-ohmic composition, and forming an insulation layer to cover an outside of the non-ohmic resistive layer, wherein, in the preparation of the non-ohmic composition, the plurality of non-ohmic particles is dispersed like a mesh in the base elastomer.

DESCRIPTION OF SIGNS AND NUMERALS 10, 12 Cable connection unit,
120 Base elastomer:
122 Elastomer (A)
124 Elastomer (B)
140 Non-ohmic particle
202 Hollow part
210 Internal semi-conductive layer
220 Non-ohmic resistive layer
240 Semi-conductive cone part
240a First semi-conductive cone part
240b Second semi-conductive cone part
242 Inclined surface
260 Insulation layer
280 External semi-conductive layer

What is claimed is:

1. A non-ohmic composition comprising a base elastomer and a plurality of non-ohmic particles,
wherein, in a case of comparing volume resistivities p of the non-ohmic composition within a range of $E \geq E_{th}$ for the non-ohmic composition not elongated,
the E being an electric field strength applied to the non-ohmic composition,
the ρ being the volume resistivity of the non-ohmic composition, and
the $E_{th}$ being a threshold electric field strength at a point where an absolute value of a variation in a slope of log p with respect to log E is maximum,
the volume resistivity ρ for the non-ohmic composition uniaxially elongated by 50% is 50 times or less the volume resistivity ρ for the non-ohmic composition not elongated.

2. The non-ohmic composition according to claim 1, wherein the threshold electric field strength $E_{th}$ for the non-ohmic composition uniaxially elongated by 50% is 1.4 times or less the $E_{th}$ for the non-ohmic composition not elongated.

3. A non-ohmic composition comprising a base elastomer and a plurality of non-ohmic particles,
wherein $E_{th}$ for the non-ohmic composition uniaxially elongated by 50% is 1.4 times or less $E_{th}$ for the non-ohmic composition not elongated,
the $E_{th}$ being a threshold electric field strength at a point where an absolute value of a variation in a slope of log p with respect to log E is maximum,
the E being an electric field strength applied to the non-ohmic composition, and
the ρ being a volume resistivity of the non-ohmic composition.

4. The non-ohmic composition according to claim 1, wherein the slope of a linear portion in a range of $E > E_{th}$ for the non-ohmic composition uniaxially elongated by 50% is within ±50% with respect to the slope of a linear portion in a range of $E > E_{th}$ for the non-ohmic composition not elongated.

5. The non-ohmic composition according to claim 1, wherein the plurality of non-ohmic particles is dispersed like a mesh in the base elastomer.

6. The non-ohmic composition according to claim 1, wherein a coefficient of variation in a distance between the centers of gravity of the plurality of non-ohmic particles is 0.5 or more as determined by the following formula (1):

$$\text{Coefficient of variation} = \text{standard deviation}/\text{average value} \quad (1).$$

7. The non-ohmic composition according to claim 1, wherein there exists a plurality of particle-free regions with no non-ohmic particles, having a diameter 1.5 times or more the mean volume diameter of the non-ohmic particles, when viewing a cross section of the non-ohmic composition.

8. The non-ohmic composition according to claim 1, wherein the base elastomer comprises:
an elastomer (A) having relatively higher compatibility with the non-ohmic particles, and
an elastomer (B) having relatively lower compatibility with the non-ohmic particles,
the elastomer (A) includes the non-ohmic particles more than the elastomer (B) does, and forms a sea phase, and
the elastomer (B) forms an island phase.

9. The non-ohmic composition according to claim 8, wherein the difference between a solubility parameter of the elastomer (A) and a solubility parameter of the elastomer (B) is 0.5 $(\text{cal/cm}^3)^{1/2}$ or more.

10. The non-ohmic composition according to claim 8, wherein the elastomer (A) is non-crosslinked, and the elastomer (B) contains a crosslinked rubber.

11. The non-ohmic composition according to claim 8, wherein the elastomer (A) contains a rubber,
the elastomer (B) contains a thermoplastic elastomer, and
a melting point of the elastomer (B) is higher than a softening point of the elastomer (A).

12. The non-ohmic composition according to claim 8, wherein the elastomer (A) and the non-ohmic particles occupy 30% or more of a total volume of the non-ohmic composition.

13. The non-ohmic composition according to claim 8, wherein the elastomer (A) and the elastomer (B) are chemically bonded to each other.

14. A cable connection unit having a cylindrical shape, in which a power cable is fitted, comprising:
a non-ohmic resistive layer having a cylindrical shape and including the non-ohmic composition according to claim 1, and
an insulation layer provided to cover an outside of the non-ohmic resistive layer.

15. A cable connection unit having a cylindrical shape, in which a power cable is fitted, comprising:
a non-ohmic resistive layer having a cylindrical shape and including the non-ohmic composition according to claim 3, and
an insulation layer provided to cover an outside of the non-ohmic resistive layer.

16. A method for producing a cable connection unit having a cylindrical shape, in which a power cable is fitted, comprising:
preparing the non-ohmic composition according to claim 1,
forming a non-ohmic resistive layer having a cylindrical shape with the non-ohmic composition, and forming an insulation layer to cover an outside of the non-ohmic resistive layer.

17. A method for producing a cable connection unit having a cylindrical shape, in which a power cable is fitted, comprising:

preparing the non-ohmic composition according to claim 3, forming a non-ohmic resistive layer having a cylindrical shape with the non-ohmic composition, and forming an insulation layer to cover an outside of the non-ohmic resistive layer.

* * * * *